US012812662B2

(12) United States Patent
Chen et al.

(10) Patent No.: US 12,812,662 B2
(45) Date of Patent: Nov. 24, 2026

(54) CHANNEL ACCESS PRIORITIZATION FOR HIGH PRIORITY TRANSMISSIONS

(71) Applicant: QUALCOMM INCORPORATED, San Diego, CA (US)

(72) Inventors: Siyi Chen, Beijing (CN); Jing Sun, San Diego, CA (US); Xiaoxia Zhang, San Diego, CA (US); Rajat Prakash, San Diego, CA (US); Changlong Xu, Beijing (CN); Luanxia Yang, Beijing (CN); Shaozhen Guo, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 18/696,266

(22) PCT Filed: Nov. 10, 2021

(86) PCT No.: PCT/CN2021/129708

§ 371 (c)(1),
(2) Date: Mar. 27, 2024

(87) PCT Pub. No.: WO2023/082078

PCT Pub. Date: May 19, 2023

(65) Prior Publication Data

US 2024/0430912 A1 Dec. 26, 2024

(51) Int. Cl.
*H04W 72/25* (2023.01)
*H04W 74/0808* (2024.01)

(52) U.S. Cl.
CPC ....... *H04W 72/25* (2023.01); *H04W 74/0808* (2013.01)

(58) Field of Classification Search
CPC .......................... H04W 72/25; H04W 74/0808
See application file for complete search history.

(56) References Cited

U.S. PATENT DOCUMENTS

2019/0200386 A1 6/2019 Yang et al.
2020/0229210 A1 7/2020 Bharadwaj et al.
(Continued)

FOREIGN PATENT DOCUMENTS

CN 113261370 8/2021
WO WO-2020146629 7/2020

OTHER PUBLICATIONS

Huawei, et al., "Further Considerations on Channel Access Priority Class", 3GPP Draft, 3GPP TSG-RAN WG2 Meeting 106, R2-1907540, Further Considerations on Channel Access Priority Class, 3rd Generation Partnership Project (3GPP), Mobile Competence Centre, 650, Route Des Lucioles, F-06921 Sophia-Antipolis, vol. RAN WG2, No. Reno, Nevada, US, Apr. 13, 219-May 17, 2019, May 3, 2019 (May 3, 2019), XP051711822, 6 Pages.
(Continued)

*Primary Examiner* — Ajay Cattungal
(74) *Attorney, Agent, or Firm* — Holland & Hart LLP

(57) ABSTRACT

Methods, systems, and devices for wireless communication are described. In some systems, a user equipment (UE) may transmit a sidelink message in accordance with one or more parameters associated with a priority of the sidelink message. The UE may determine a channel access priority class (CAPC) associated with the sidelink message based on the priority of the sidelink message. The UE may perform a listen-before-talk (LBT) procedure in accordance with the CAPC to gain access to a wireless channel for a channel occupancy time (COT). The UE may select a set of starting positions relative to the COT based on the priority, the CAPC, or both. The UE may transmit the sidelink message within the COT based on a starting position of the set of starting positions and the LBT procedure. The UE may perform a quantity of one or more retransmissions of the sidelink message based on the CAPC.

28 Claims, 14 Drawing Sheets

(56) References Cited

U.S. PATENT DOCUMENTS

| | | | | |
|---|---|---|---|---|
| 2020/0267762 | A1 | 8/2020 | Lee | |
| 2021/0092783 | A1 | 3/2021 | Sun et al. | |
| 2021/0298070 | A1 | 9/2021 | Zhang et al. | |
| 2022/0060944 | A1* | 2/2022 | Sun | H04W 72/56 |
| 2022/0183049 | A1* | 6/2022 | Lee | H04L 1/08 |
| 2022/0369344 | A1* | 11/2022 | Liu | H04W 72/20 |
| 2023/0064680 | A1* | 3/2023 | Huang | H04L 1/1812 |
| 2023/0232457 | A1* | 7/2023 | Hu | H04W 72/25<br>370/329 |
| 2024/0276549 | A1* | 8/2024 | Freda | H04W 72/40 |

OTHER PUBLICATIONS

International Search Report and Written Opinion—PCT/CN2021/129708—ISA/EPO—Apr. 26, 2022.

Supplementary European Search Report—EP21963535—Search Authority—The Hague—Jul. 9, 2025.

* cited by examiner

CHANNEL ACCESS PRIORITIZATION FOR HIGH PRIORITY TRANSMISSIONS

CROSS REFERENCE

The present Application is a 371 national stage filing of International PCT Application No. PCT/CN2021/129708 by Chen et al. entitled "CHANNEL ACCESS PRIORITIZATION FOR HIGH PRIORITY TRANSMISSIONS," filed Nov. 10, 2021, which is assigned to the assignee hereof, and which is expressly incorporated by reference in its entirety herein.

FIELD OF TECHNOLOGY

The following relates to wireless communication, including channel access prioritization for high priority transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may communicate directly with another UE over a sidelink. As part of this process, the UE may perform a channel sensing procedure to identify available resources for transmitting a sidelink message.

SUMMARY

The described techniques relate to improved methods, systems, devices, and apparatuses that support channel access prioritization for high priority transmissions. Generally, the described techniques provide for a sidelink user equipment (UE) to generate a sidelink message associated with a defined sidelink traffic priority and determine a quantity of retransmissions, a quantity of resources, a starting position, or any combination thereof for the sidelink message based on the sidelink traffic priority of the sidelink message. For example, the UE may determine a channel access priority class (CAPC) associated with the sidelink message based on the sidelink traffic priority of the sidelink message. In some examples, the UE may be configured with information that defines a relationship between each possible sidelink traffic priority and a respective CAPC, and the UE may determine the CAPC based on the configured information. The UE may determine a quantity of retransmissions, a quantity of sidelink resources, or both for the sidelink message based on the priority and the CAPC. The quantity of retransmissions, the quantity of sidelink resources, or both may increase as the priority increases, which may support favorable channel access for high priority transmissions.

In some examples, the UE may perform a listen-before-talk (LBT) procedure to obtain access to a wireless channel for a channel occupancy time (COT). The UE may transmit the sidelink message via one or more sidelink resources during the COT based on a success of the LBT procedure. The UE may select a set of one or more starting positions with respect to the COT from multiple sets of starting positions based on the priority of the sidelink message. The priority may correspond to the CAPC, the sidelink traffic priority, or both. The multiple sets of starting positions may be configured for the UE, for a resource pool that includes the one or more sidelink resources for the sidelink message, defined in a table or other configured or standardized data structure, or any combination thereof, and each set of starting positions may be associated with a respective priority. The UE may randomly or pseudorandomly select a starting position from the set of starting positions. The starting position may be relative to a beginning boundary of the COT for the UE. For example, the starting position may indicate an offset from the beginning boundary of the COT. The UE may transmit the sidelink message via the wireless channel and within the COT in accordance with the starting position and a success of the LBT procedure. The configured starting positions may be located earlier in time for higher priorities than lower priorities, which may support earlier channel access for higher priority transmissions than lower priority transmissions.

A method for wireless communication at a UE is described. The method may include determining a CAPC associated with a sidelink message based on a priority of the sidelink message, transmitting the sidelink message via one or more sidelink resources based on an LBT procedure performed by the UE, and performing one or more retransmissions of the sidelink message, where a quantity of the one or more retransmissions is based on the CAPC and the priority of the sidelink message.

An apparatus for wireless communication at a UE is described. The apparatus may include a processor, memory coupled with the processor, and instructions stored in the memory. The instructions may be executable by the processor to cause the apparatus to determine a CAPC associated with a sidelink message based on a priority of the sidelink message, transmit the sidelink message via one or more sidelink resources based on an LBT procedure performed by the UE, and perform one or more retransmissions of the sidelink message, where a quantity of the one or more retransmissions is based on the CAPC and the priority of the sidelink message.

Another apparatus for wireless communication at a UE is described. The apparatus may include means for determining a CAPC associated with a sidelink message based on a priority of the sidelink message, means for transmitting the sidelink message via one or more sidelink resources based on an LBT procedure performed by the UE, and means for performing one or more retransmissions of the sidelink message, where a quantity of the one or more retransmissions is based on the CAPC and the priority of the sidelink message.

A non-transitory computer-readable medium storing code for wireless communication at a UE is described. The code may include instructions executable by a processor to determine a CAPC associated with a sidelink message based on a priority of the sidelink message, transmit the sidelink message via one or more sidelink resources based on an LBT procedure performed by the UE, and perform one or more retransmissions of the sidelink message, where a quantity of the one or more retransmissions is based on the CAPC and the priority of the sidelink message.

Some examples of the method, apparatuses, and non-transitory computer-readable medium described herein may further include operations, features, means, or instructions for determining a quantity of the one or more sidelink resources based on the CAPC and the priority of the sidelink message, where the quantity of the one or more sidelink resources may be proportional to a value of the CAPC.

In some examples of the method, apparatuses, and non-transitory computer-readable medium described herein, the quantity of the one or more retransmissions may be proportional to a value of the CAPC.

Some examples of the method, apparatuses, and non-transitory computer-readable medium described herein may further include operations, features, means, or instructions for transmitting a second sidelink message via one or more second sidelink resources based on a second CAPC associated with the second sidelink message, where the second sidelink message and the sidelink message may be transmitted separately based on the second CAPC being different than the CAPC.

Some examples of the method, apparatuses, and non-transitory computer-readable medium described herein may further include operations, features, means, or instructions for determining a set of multiple priorities of a set of multiple sidelink messages including at least the sidelink message, determining the CAPC for transmitting the set of multiple sidelink messages based on one or more parameters associated with the set of multiple sidelink messages, the one or more parameters including a packet delay budget (PDB), a reliability, a packet size, or any combination thereof associated with each sidelink message of the set of multiple sidelink messages, and transmitting the set of multiple sidelink messages based on the CAPC.

Some examples of the method, apparatuses, and non-transitory computer-readable medium described herein may further include operations, features, means, or instructions for receiving a control signal that indicates a configuration of one or more threshold values for selecting the CAPC and selecting the CAPC based on the one or more threshold values, where the CAPC may be a maximum CAPC of the set of multiple CAPCs or a minimum CAPC of the set of multiple CAPCs based on the configuration of the one or more threshold values.

Some examples of the method, apparatuses, and non-transitory computer-readable medium described herein may further include operations, features, means, or instructions for determining one or more threshold values for selecting the CAPC and selecting the CAPC based on the one or more threshold values, where the CAPC may be a maximum CAPC of the set of multiple CAPCs or a minimum CAPC of the set of multiple CAPCs based on a configuration of the one or more threshold values.

Some examples of the method, apparatuses, and non-transitory computer-readable medium described herein may further include operations, features, means, or instructions for transmitting, to a base station, a signal that indicates a set of multiple priorities of a set of multiple sidelink messages including at least the sidelink message and one or more parameters associated with the set of multiple sidelink messages, receiving, from the base station, an indication of a CAPC for transmitting the set of multiple sidelink messages based on the one or more parameters, where the one or more parameters include a PDB, a reliability, a packet size, or any combination thereof associated with each sidelink message of the set of multiple sidelink messages, and transmitting the set of multiple sidelink messages based on the CAPC.

In some examples of the method, apparatuses, and non-transitory computer-readable medium described herein, the CAPC for the sidelink message may correspond to a contention window size for the sidelink message.

A method for wireless communication at a UE is described. The method may include obtaining access to a wireless channel for a COT in accordance with an LBT procedure, selecting, from a set of multiple sets of starting positions, a set of starting positions for transmitting a sidelink message based on a priority of the sidelink message, where each set of starting positions of the set of multiple sets of starting positions is associated with a respective priority, selecting a starting position with respect to the COT randomly from the set of starting positions, and transmitting the sidelink message via the wireless channel and within the COT in accordance with the starting position and the LBT procedure.

An apparatus for wireless communication at a UE is described. The apparatus may include a processor, memory coupled with the processor, and instructions stored in the memory. The instructions may be executable by the processor to cause the apparatus to obtain access to a wireless channel for a COT in accordance with an LBT procedure, select, from a set of multiple sets of starting positions, a set of starting positions for transmitting a sidelink message based on a priority of the sidelink message, where each set of starting positions of the set of multiple sets of starting positions is associated with a respective priority, select a starting position with respect to the COT randomly from the set of starting positions, and transmit the sidelink message via the wireless channel and within the COT in accordance with the starting position and the LBT procedure.

Another apparatus for wireless communication at a UE is described. The apparatus may include means for obtaining access to a wireless channel for a COT in accordance with an LBT procedure, means for selecting, from a set of multiple sets of starting positions, a set of starting positions for transmitting a sidelink message based on a priority of the sidelink message, where each set of starting positions of the set of multiple sets of starting positions is associated with a respective priority, means for selecting a starting position with respect to the COT randomly from the set of starting positions, and means for transmitting the sidelink message via the wireless channel and within the COT in accordance with the starting position and the LBT procedure.

A non-transitory computer-readable medium storing code for wireless communication at a UE is described. The code may include instructions executable by a processor to obtain access to a wireless channel for a COT in accordance with an LBT procedure, select, from a set of multiple sets of starting positions, a set of starting positions for transmitting a sidelink message based on a priority of the sidelink message, where each set of starting positions of the set of multiple sets of starting positions is associated with a respective priority, select a starting position with respect to the COT randomly from the set of starting positions, and transmit the sidelink message via the wireless channel and within the COT in accordance with the starting position and the LBT procedure.

In some examples of the method, apparatuses, and non-transitory computer-readable medium described herein, selecting the set of starting positions may include operations, features, means, or instructions for receiving control signaling that indicates the set of multiple sets of starting positions for the UE and selecting the set of starting positions from the set of multiple sets of starting positions for the UE based on the priority of the sidelink message.

In some examples of the method, apparatuses, and non-transitory computer-readable medium described herein, selecting the set of starting positions may include operations, features, means, or instructions for receiving control signaling that indicates the set of multiple sets of starting positions for a resource pool, where the sidelink message may be transmitted via one or more sidelink resources of the resource pool and selecting the set of starting positions from the set of multiple sets of starting positions for the resource pool based on the priority of the sidelink message.

In some examples of the method, apparatuses, and non-transitory computer-readable medium described herein, transmitting the sidelink message may include operations, features, means, or instructions for transmitting an extended cyclic prefix (CP) at the starting position based on a success of the LBT procedure, where the extended CP reserves the wireless channel for the sidelink message and transmitting the sidelink message in a first symbol subsequent to the extended CP.

In some examples of the method, apparatuses, and non-transitory computer-readable medium described herein, transmitting the sidelink message may include operations, features, means, or instructions for extending a duration of the LBT procedure based on the starting position, where the extended duration of the LBT procedure punctures a first symbol of the COT for the UE and transmitting the sidelink message via a portion of the first symbol that may be subsequent to the starting position based on a success of the LBT procedure.

In some examples of the method, apparatuses, and non-transitory computer-readable medium described herein, the priority of the sidelink message may be greater than a second priority associated with a second set of starting positions of the set of multiple sets of starting positions and each starting position of the set of starting positions may be prior to each starting position of the second set of starting positions in time based on the priority associated with the set of starting positions being greater than the second priority associated with the second set of starting positions.

In some examples of the method, apparatuses, and non-transitory computer-readable medium described herein, the priority of the sidelink message may correspond to a CAPC or a sidelink traffic priority.

DETAILED DESCRIPTION

Figure 1:
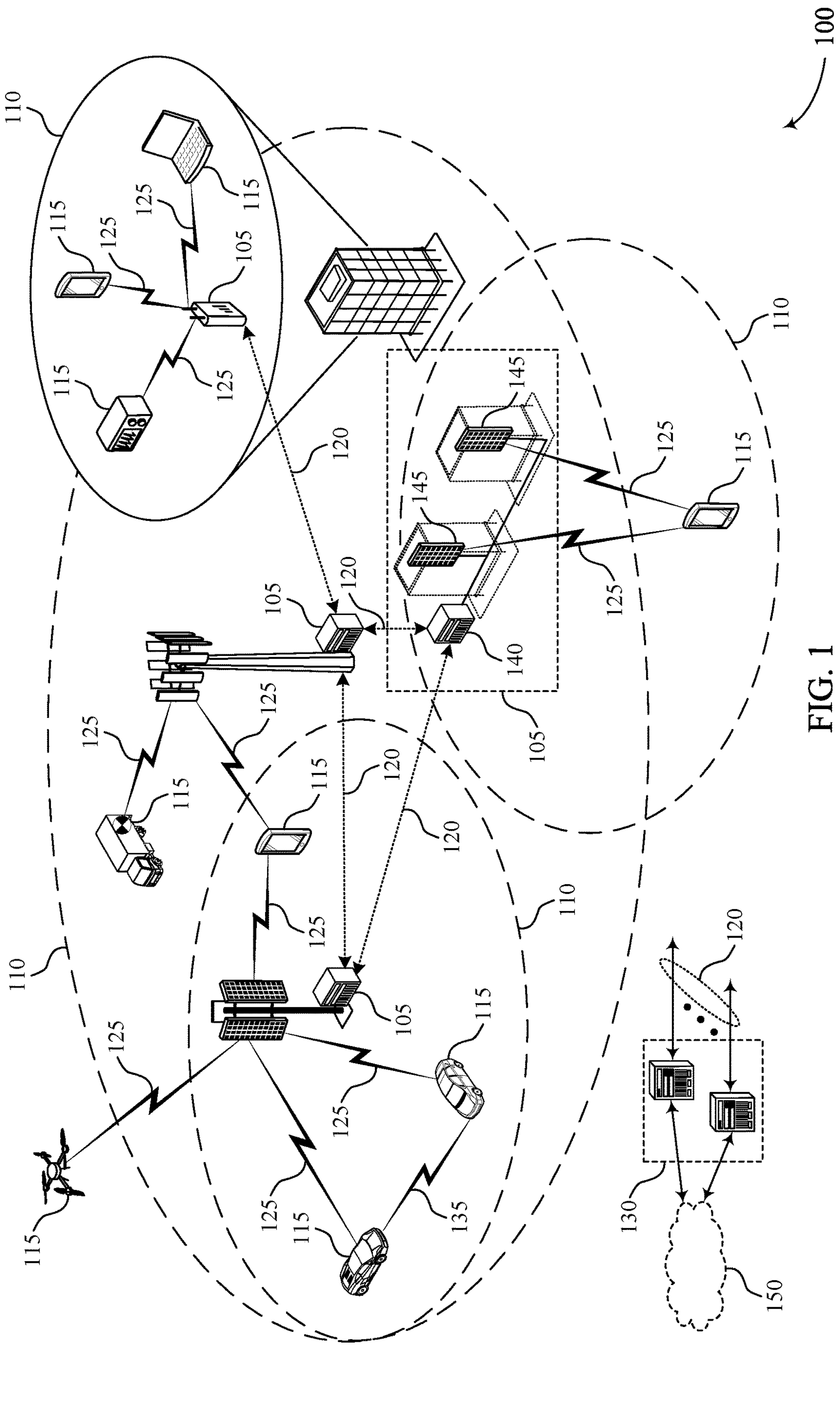
FIG. 1 illustrates an example of a wireless communications system that supports channel access prioritization for high priority transmissions in accordance with aspects of the present disclosure.

Some wireless communications systems may support sidelink communications, in which two or more UEs may communicate via a direct sidelink communication link. The UEs may support a sidelink resource allocation mode 1 or mode 2. In the sidelink resource allocation mode 1, a base station may reserve resources and schedule sidelink transmissions by the UEs. In the sidelink resource allocation mode 2, a UE may autonomously perform channel sensing to select or reserve resources for a sidelink transmission. To perform channel sensing, the UE may measure received signals, such as reference signals or control signals, to identify available resources for a sidelink transmission. The sensing procedure may, in some examples, be referred to as a listen-before-talk (LBT) procedure, and the UE may obtain access to a channel for a channel occupancy time (COT) based on a success of the LBT procedure.

On a sidelink licensed band, the UE may determine, or estimate, a resource utilization by the UE, by one or more other sidelink UEs, or both. The UE may determine one or more parameters for transmitting a sidelink message based on the resource utilization estimation, which may provide for the UE to prioritize channel access for high priority transmissions in the sidelink licensed band. During sidelink communication on a sidelink unlicensed band, the UE may receive signals from multiple different types of devices that support multiple different radio access technologies (RATs), and the UE may not know whether a received signal is from another sidelink UE or from a device that supports a different RAT, such as a Wi-Fi node. In such cases, each device may not estimate a resource utilization, or the UE may not be able to determine a relative priority of each transmission, or both. As such, a sidelink UE may not be able to ensure prioritization of channel access for high priority transmissions in the sidelink unlicensed band.

To support earlier and more frequent channel access for high priority sidelink transmissions over low priority sidelink transmissions, a sidelink UE as described herein may be configured to determine a quantity of retransmissions for a sidelink message, a quantity of resources for the sidelink message, a set of starting positions for the sidelink message, or any combination thereof based on a priority of the sidelink message. Higher priority messages may be configured to support more retransmissions, more resources, earlier starting positions, or any combination thereof than lower priority messages to support prioritized channel access.

The UE (e.g., one or more upper layers of the UE) may generate a sidelink message and determine or assign a sidelink traffic priority to the sidelink message. In some examples, the UE may determine a channel access priority class (CAPC) for the sidelink message based on the sidelink traffic priority. The UE may determine the CAPC based on information configured for the UE that defines a relationship between each potential sidelink traffic priority and a respective CAPC. In some examples, the UE may determine a quantity of retransmissions, a quantity of reserved resources, or both for the sidelink message based on the priority and the CAPC. For example, the configured information may define a relationship between each sidelink traffic priority and a respective quantity of retransmissions, a respective quantity of reserved resources, or both. The quantity of retransmissions and the quantity of reserved resources may increase as the priority increases, which may provide for more frequent and more reliable channel access for higher priority transmissions than lower priority transmissions.

In some examples, the UE may determine a starting position for transmitting a sidelink message based on the priority of the sidelink message. The starting position may correspond to a time at which the UE may gain access to a wireless channel after performing an LBT procedure. The starting position may indicate a time offset relative to a beginning boundary of a first symbol of a COT for the UE. The UE may be configured with a different set of starting positions for each priority (e.g., for each sidelink traffic priority, each CAPC, or both). The sets of starting positions may be signaled to the UE or defined at the UE, and may be configured per UE, per resource pool, or both. The UE may select a set of starting positions from the multiple sets based on the priority of the sidelink message, and the UE may randomly or pseudorandomly select a single starting position from the set of starting positions. The UE may transmit the sidelink message during the COT based on the selected starting position and a success of the LBT procedure before the selected starting position. A first set of starting positions for a first priority may include starting positions that are earlier in time than a second set of starting positions associated with a second priority that is less than the first priority. The UE may thereby support earlier channel access for transmitting higher priority sidelink messages than lower priority sidelink messages to reduce latency and improve reliability of sidelink communications.

Aspects of the disclosure are initially described in the context of wireless communications systems. Additional aspects of the disclosure are described with respect to sidelink channel access timelines and process flows. Aspects of the disclosure are further illustrated by and described with reference to apparatus diagrams, system diagrams, and flowcharts that relate to channel access prioritization for high priority transmissions.

FIG. 1 illustrates an example of a wireless communications system 100 that supports channel access prioritization for high priority transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix (CP). A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the CP prepended to each symbol period). In some wireless communications systems 100, a slot may further be divided into multiple mini-slots containing one or more symbols. Excluding the CP, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna array's or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support sidelink communications between two or more UEs 115. Techniques described herein may provide for a UE 115 to perform a sidelink transmission in accordance with a quantity of retransmissions, a quantity of resources, a starting position, or any combination thereof that may each be configured for a certain priority of the sidelink transmission. The described techniques may support prioritization of channel access in a sidelink licensed or unlicensed band for high priority transmissions. The UE 115 may determine a CAPC associated with a sidelink message based on a sidelink traffic priority of the sidelink message. In some examples, the UE 115 may be configured with information (such as a table) that defines a relationship between each sidelink traffic priority of a set of potential sidelink traffic priorities and a respective CAPC, and the UE 115 may determine the CAPC based on the configured information.

The UE 115 may perform an LBT procedure to obtain access to a wireless channel for a COT. The UE 115 may transmit the sidelink message via one or more sidelink resources during the COT based on a success of the LBT procedure. In some examples, the UE 115 may determine a quantity of retransmissions, a quantity of sidelink resources, or both for the sidelink message based on the priority, the CAPC, or both (e.g., based on the configured information). The UE 115 may perform the determined quantity of retransmissions of the sidelink message. The quantity of retransmissions, the quantity of sidelink resources, or both may increase as the priority increases, which may support prioritized channel access for high priority transmissions.

In some examples, the UE 115 may select a set of one or more starting positions from multiple sets of starting positions that are each associated with a respective priority based on the priority of the sidelink message. The priority may correspond to the CAPC, the sidelink traffic priority, or both. The multiple sets of starting positions may be configured for the UE 115, for a resource pool that includes the one or more sidelink resources for the sidelink message, defined in a table or other configured or standardized data structure, or any combination thereof. The UE 115 may randomly or pseudorandomly select a starting position from the set of starting positions and transmit the sidelink message at or based on the selected starting position. The UE 115 may transmit the sidelink message via the wireless channel and within the COT in accordance with the starting position and a success of the LBT procedure prior to the starting position. The configured starting positions may be located earlier in time for higher priorities than lower priorities, which may provide for faster and more reliable channel access for higher priority transmissions than lower priority transmissions.

Figure 2:
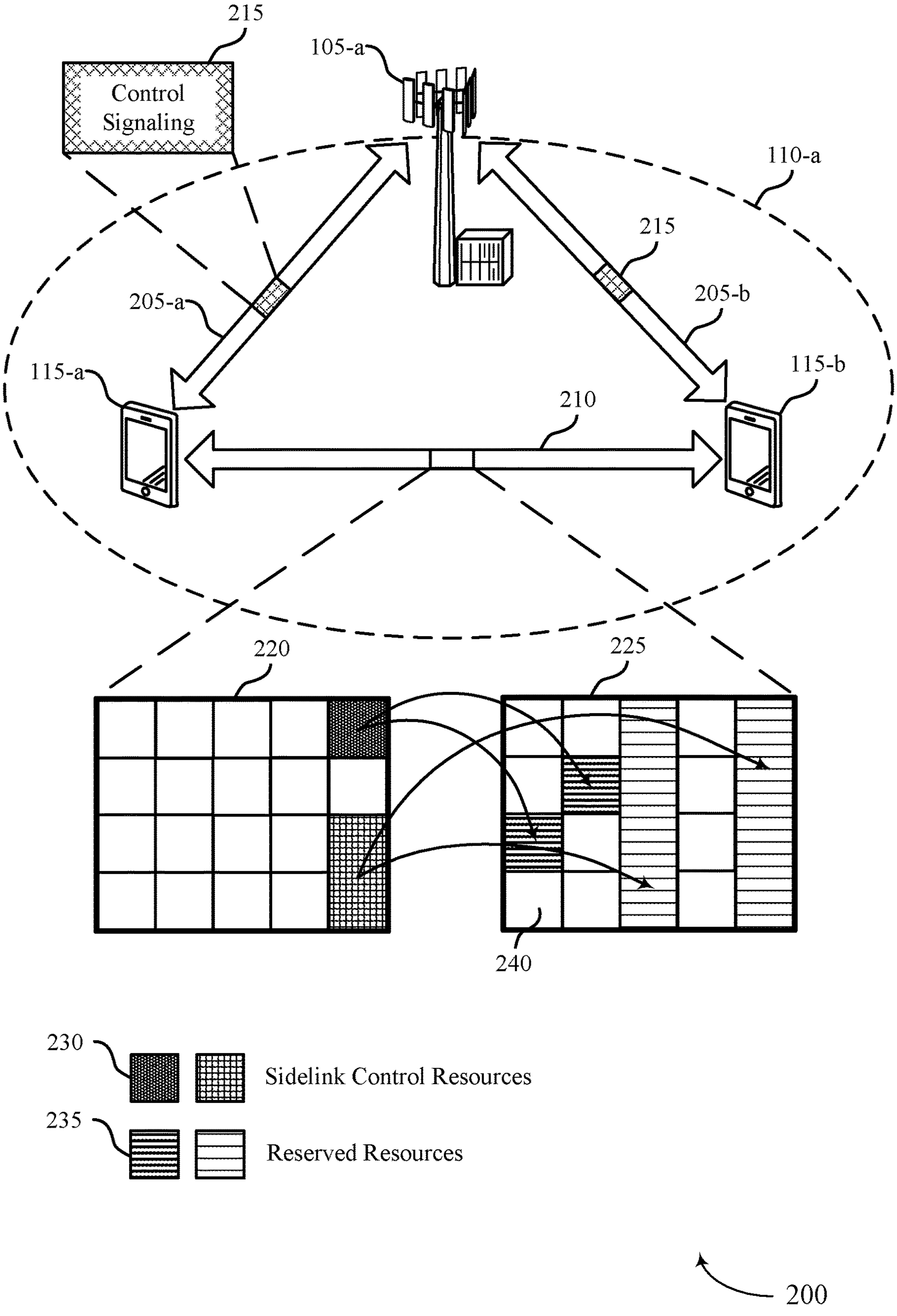
FIG. 2 illustrates an example of a wireless communications systems that supports channel access prioritization for high priority transmissions in accordance with aspects of the present disclosure.

FIG. 2 illustrates an example of a wireless communications system 200 that supports channel access prioritization for high priority transmissions in accordance with aspects of the present disclosure. The wireless communications system 200 may implement or be implemented by aspects of the wireless communications system 100. For example, the wireless communications system 200 may include a base station 105-*a* and UEs 115-*a* and 115-*b* (e.g., among other UEs 115), which may represent examples of a base station 105 and a UE 115 as described with reference to FIG. 1. The base station 105-*a* and the UEs 115-*a* and 115-*b* may communicate within a geographic coverage area 110-*a*. The base station 105-*a* may communicate with the UE 115-*a* and the UE 115-*b* via the communication link 205-*a* and the communication link 205-*b*, respectively. The UE 115-*a* and the UE 115-*b* may support sidelink communication via the sidelink communication link 210 (e.g., a PC5 link).

The UEs 115-*a* and 115-*b* may support uplink communications with the base station 105-*a* based on one or more configured grants (CGs). For example, the base station 105-*a* may transmit a CG for an uplink message (e.g., a CG physical uplink shared channel (PUSCH) transmission) to the UE 115-*a*. The CG may indicate a configured starting position for the uplink message. The UE 115-*a* transmit the uplink message to the base station 105-*a* via the communication link 205-*a* by accessing a transmission opportunity provided by the CG. In some cases, the base station 105-*a* may configure a CG for multiple UEs 115, such as the UEs 115-*a* and 115-*b*, and the UEs 115 may perform LBT, pass the LBT procedure, and start transmitting at a same configured starting time based on the CG. In such cases, the transmissions by each UE 115 may collide or interfere with each other.

To reduce potential for collision between uplink transmissions, the base station 105-*a* may support multiple starting time offsets for the UEs 115 with sub-symbol granularity (e.g., using a further enhanced licensed assisted access (FeLAA) autonomous uplink (AUL) approach). That is, the base station 105-*a* may configure different starting time offsets for different UEs 115, such that the UEs 115 may finish LBT and gain access to the channel at different starting times with respect to the same symbol. The starting time offsets may, in some cases, support earlier channel access to a symbol for higher priority uplink transmissions.

The base station 105-*a* may, in some examples, allocate multiple resource interlaces for each uplink transmission (e.g., an all interlace allocation), such that one uplink transmission may occupy a channel. The base station 105-*a* may transmit the control signaling 215 to the UE 115-*a*, the UE 115-*b*, and one or more other UEs 115 to configure a set of starting time offsets. The control signaling 215 may, in some examples, be an RRC configuration (e.g., a semi-static configuration). The UEs 115-*a* and 115-*b* may each randomly or pseudorandomly select a starting time offset from the RRC configured offset set to use for performing the transmission.

In some other examples, the base station 105-*a* may allocate a portion of interlaces of a communication band for each uplink transmission (e.g., partial interlace allocation), such that two or more uplink transmissions may occupy a channel at the same time with reduced interference. In such cases, the base station 105-*a* may configure a single offset for the UEs 115 (e.g., a common offset may be configured for FDM uplink CG UEs 115 to reduce blockage between transmissions). The base station 105-*a* may transmit an RRC configuration that indicates the configured offset. The UEs 115-*a* and 115-*b* may transmit uplink transmissions at the configured starting time offset using FDM techniques.

A first UE 115 that selects a starting time offset that is prior to the other starting time offsets in time may finish LBT and transmit a signal at the starting time to reserve the channel for the uplink transmission. The other UEs 115 may finish LBT after the signal is transmitted by the first UE 115, and the LBT procedure may fail due to the signal from the first UE 115 occupying the channel. In some examples, the UE 115 may be configured with the relatively early starting time based on a relatively high priority of the UE 115 or a message to be transmitted by the UE 115.

The starting time offset may correspond to a length of a CP extension of a first symbol in a COT for the UE 115. For example, the starting time offset may be prior to a beginning boundary of a first symbol of the COT. The UE 115 may transmit an extended CP that starts at the starting time offset to reserve the channel. The UE 115 may transmit the scheduled uplink transmission at the beginning boundary of the first symbol after the extended CP. The CP extension may have a configured maximum duration (e.g., 72 us or less, with a granularity of 9 us, or some other duration, regardless of a subcarrier spacing (SCS)).

In some examples, such as for uplink and downlink communication on a licensed or unlicensed operating band, the base station 105-*a*, the UEs 115-*a* and 115-*b*, or both may perform an LBT procedure for a downlink or uplink transmission, respectively, based on a CAPC of the transmission. The CAPC may be configured at the device (e.g., by one or more upper layers of the device), or the device may receive control signaling 215 or some other signaling that indicates the CAPC for each transmission. Each CAPC may be configured with one or more parameters for performing LBT, such as a maximum COT (MCOT) duration, a contention window size, a defer period (n), or any combination thereof.

The base station 105-*a*, the UEs 115-*a* and 115-*b*, or both may perform an LBT procedure within the defer period to determine whether a channel is available or occupied. If the channel is available (e.g., a measured signal quality or strength is below a threshold) during the defer period, the device may sense the channel during a contention window and transmit a transmission within a corresponding MCOT if the channel is still idle at an end of the contention window. If the channel is occupied during the defer period, the contention window, or both, the device may continue to monitor the channel during one or more other defer periods. The contention window size, the MCOT duration, the defer period, or any combination thereof may decrease as a priority of the transmission increases, which may support prioritization of channel access for higher priority uplink and downlink transmissions. Table 1 illustrates an example configuration of parameters per CAPC (e.g., LBT priority classes (p)).

TABLE 1

| CAPC Parameters | | | | | |
|---|---|---|---|---|---|
| LBT Priority Class (p) | Minimum Contention Window (CWmin) | Maximum Contention Window (CWmax) | n (For Defer Period) | MCOT | Contention Window Sizes |
| 1 | 3 | 7 | 1 | 2 ms | {3, 7} |
| 2 | 7 | 15 | 1 | 3 ms | {7, 15} |
| 3 | 15 | 63 | 3 | 8 ms or 10 ms | {15, 31, 63} |
| 4 | 15 | 1023 | 7 | 8 ms or 10 ms | {15, 31, 63, 127, 255, 511, 1023} |

In the example of Table 1, the LBT priority class index (p) may increase as priority decreases. For example, the LBT priority class index of four may correspond to a lower priority transmission than the LBT priority class indices of three, two, and one. Although four LBT priority classes are illustrated in Table 1, it is to be understood that any quantity of LBT priority classes may be configured for uplink and downlink communications, and each LBT priority class may correspond to any quantity of parameters, which may be the same as or different than the parameters shown in Table 1.

As shown in the example of Table 1, higher priority transmissions may be allocated smaller contention window sizes, which may correspond to smaller MCOT durations, shorter defer periods, or both, than lower priority transmissions. The CAPC may thereby provide for the base station 105-*a*, the UE 115-*a*, the UE 115-*b*, and one or more other wireless devices to prioritize channel access for higher priority transmissions.

The UEs 115-*a* and 115-*b* may additionally or alternatively support sidelink communications according to a sidelink resource allocation mode 1 or a sidelink resource allocation mode 2. To facilitate sidelink communication, in some examples, the UE 115-*a* and the UE 115-*b* may each be configured with a set of time and frequency resources allocated for sidelink communication within one or more sidelink resource pools (e.g., physical sidelink control channel (PSCCH) resources, physical sidelink shared channel (PSSCH) resources, or both). A sidelink resource pool may include one or more subchannels in a frequency domain and one or more slots in a time domain. As such, a sidelink resource pool may include multiple resource elements 240, where a resource element 240 may correspond to a slot and a subchannel.

Communications according to the sidelink resource allocation mode 1 may be scheduled by the base station 105-*a*. For example, the base station 105-*a* may transmit the control signaling 215 to a transmitting UE 115, such as the UE 115-*a*, to indicate one or more sidelink resources in a sidelink resource pool for the UE 115-*a* to use for transmitting a sidelink message to the UE 115-*b*. The UE 115-*a* may transmit the sidelink message via the indicated sidelink resources. In such cases, the base station 105-*a* may schedule and allocate sidelink resources based on a priority of each transmission, such that the base station 105-*a* may prioritize channel access for higher priority transmissions over lower priority transmissions.

Communications according to the sidelink resource allocation mode 2 may be scheduled by a transmitting UE 115, such as the UE 115-*a*. For example, the UE 115-*a* may autonomously (e.g., without signaling from the base station 105-*a*) identify available resources within a sidelink resource pool for performing a sidelink transmission. In either sidelink resource allocation mode 1 or mode 2, the UE 115-*a* may transmit sidelink control information (SCI) (e.g., SCI-1) to the UE 115-*b* and one or more other sidelink UEs 115 to indicate the reserved resources 235 for the sidelink transmission. The UE 115-*a* may transmit the SCI via one or more sidelink control resources 230.

During sidelink resource allocation mode 2, the UE 115-*a* may perform an LBT procedure, which may be referred to as a sensing procedure, to obtain access to a sidelink channel for a COT. To perform the LBT procedure, the UE 115-*a* may monitor for one or more reference signals or other control signals, such as SCI, and measure a signal strength or quality of the signals to determine whether the channel is occupied during the COT. If the UE 115-*a* determines that the channel is occupied during the COT, the UE 115-*a* will delay the transmission and perform LBT for a second COT. If the UE 115-*a* determines that the channel is available during the COT, the UE 115-*a* will reserve one or more available sidelink resources and perform the sidelink transmission in the one or more sidelink resources during the COT.

In some examples, the UE 115-*a* may perform the LBT procedure within a sensing window 220, and the signals received via the sensing window 220 may correspond to resources within a resource selection window 225 that is subsequent to the sensing window 220 in a time domain. The resource selection window 225 may include a set of candidate resources (e.g., resources that the UE 115-*a* may potentially transmit in). One or more of the candidate resources in the resource selection window 225 may be reserved resources 235 that are reserved for a sidelink transmission by another UE 115, which may be indicated by a first stage SCI, or some other signaling transmitted via the sidelink control resources 230 of the sensing window 220. In some examples, the reserved resources 235 may occupy a subset of resources in the frequency domain, and multiple sidelink UEs 115 may transmit at a same time and in separate frequency resources within a channel (e.g., FDM communication). Additionally or alternatively, the reserved resources 235 may occupy each frequency resource in the channel.

The UE 115-*a* may thereby perform LBT to obtain access to a wireless channel for a COT that includes one or more available sidelink resources. To improve sidelink resource reservation and sidelink communication via a licensed frequency band, the UE 115-*a* may estimate a relative priority of one or more sidelink transmissions via the licensed frequency band. In some examples, the UE 115-*a* may determine a priority of one or more other sidelink transmissions based on an indication in an SCI received during the sensing window 220. The UE 115-*a* may refrain from transmitting in the reserved resources 235 indicated by the SCI if the priority is greater than a priority of a sidelink message to be transmitted by the UE 115-*a*, or the UE 115-*a* may transmit the sidelink message in the reserved resources 235 if the priority indicated by the SCI is less than the priority of the sidelink message.

In some examples, the UE 115-*a* may estimate or characterize an amount of congestion within a sidelink channel based on one or more metrics, such as a channel occupancy ratio (CR), a channel busy ratio (CBR), or both in addition to performing channel sensing. The CBR may indicate a ratio of subchannels that experience a signal strength (e.g., a received signal strength indicator (RSSI)) above a threshold value to a total quantity of subchannels in a defined time period (e.g., in a previous 100 subframes). The threshold value may be configured at the UE 115-*a* or indicated to the UE 115-*a* via control signaling 215 (e.g., RRC signaling). The CR may quantify a channel occupancy generated by the UE 115-*a*. For example, the CR may correspond to a ratio between a quantity of subchannels utilized by the UE 115-*a* and a total quantity of subchannels. The quantity of subchannels utilized by the UE 115-*a* may correspond to a quantity of subchannels previously used by the UE 115-*a* within a configured quantity of subframes prior to the present subframe (n) (e.g., subframes [n−a, n−1], where a may be a configured quantity) and a quantity of subchannels selected by the UE 115-*a* for retransmissions within a second configured quantity of subframes including the present subframe (e.g., subframes [n, n+b], where b may be a configured quantity). In some cases, the UE 115-*a* may be configured with a quantity of retransmissions for a sidelink transmission. For example, the UE 115-*a* may receive control signaling 215 that indicates a maximum quantity of retransmissions (e.g., RRC signaling that includes a field, such as the MaxTxTransNumPSSCH field configured to indicate a quantity of retransmissions).

The UE 115-*a* may be configured to support a quantity of CBR ranges. Each CBR range may correspond to a CR limit (e.g., a maximum CR). For example, the UE 115-*a* may not exceed the respective CR limit for each CBR range. When the UE 115-*a* has a sidelink message to transmit, the UE 115-*a* may measure the CBR and map the CBR to a configured CBR range to identify the CR limit. If an estimated CR of the UE 115-*a* is greater than the CR limit for the measured CBR range, the UE 115-*a* may adjust one or more transmission parameters. For example, the UE 115-*a* may drop one or more data packets for transmission, reduce a transmission power, or refrain from transmitting the sidelink message. If the CR is less than or equal to the CR limit, the UE 115-*a* may transmit the sidelink message according to one or more current transmission parameters for the UE 115-*a*.

Each transmitting UE 115 in the wireless communications system 200 may perform similar CR and CBR measurements to determine whether and how to transmit a sidelink message. The UEs 115 may thereby utilize the CR and CBR mechanisms to reduce channel congestion. The CR and CBR measurements may additionally or alternatively support prioritization of higher priority transmissions over lower priority transmissions in the licensed sidelink band. For example, the CR and CBR mechanisms may provide for the UE 115-*a* to reserve more resources for relative high priority transmissions than if the UE 115-*a* does not use the CR and CBR mechanisms.

An estimated or measured priority of one or more signals transmitted via a sidelink unlicensed band may be inaccurate or ambiguous. For example, the sidelink unlicensed band may be utilized by one or more different types of devices that may support one or more different RATs (e.g., a Wi-Fi node, an NR-U node, or some other device). In some examples, the other devices may not indicate a priority of each transmission, or the indicated priority may be different than a sidelink traffic priority. Additionally or alternatively, the UE 115-*a* may not know which signals are received from each device, which may reduce an accuracy and reliability of the CR and CBR measurement. As such, the UE 115-*a* may not be able to prioritize channel access for higher priority transmissions over lower priority transmissions due to the different RATs associated with the unlicensed band.

Techniques described herein may provide for a transmitting sidelink UE 115 to prioritize channel access for higher priority transmissions over lower priority transmissions on a sidelink licensed band, a sidelink unlicensed band, or both.

As described herein, a maximum quantity of retransmissions, a maximum quantity of sidelink resources, a set of starting positions, or any combination thereof may be configured per priority, which may provide for earlier and more reliable channel access for transmissions having higher priorities than transmissions having lower priorities. For example, the sidelink UE 115 may transmit a low priority sidelink message later in time, may perform fewer retransmissions of the sidelink message, may reserve fewer resources for the sidelink message, or any combination thereof than for a higher priority sidelink message. The priority may correspond to a sidelink traffic priority, a CAPC, or both.

One or more upper layers of a transmitting sidelink UE 115, such as the UE 115-*a*, may generate a sidelink message associated with a certain priority to transmit to another UE 115. The priority may correspond to a sidelink traffic priority determined from a configured set of potential sidelink traffic priorities (e.g., a set of eight sidelink traffic priorities with indices [0, 1, . . . 7], or some other configuration). The UE 115-*a* may determine a CAPC for the sidelink message based on the sidelink traffic priority. In some examples, the UE 115-*a* may be configured with a table or other data structure that defines a relationship between each sidelink traffic priority and a respective CAPC, and the UE 115-*a* may identify the CAPC for the sidelink message based on the table. The table may be configured at the UE 115-*a* (e.g., pre-defined) or indicated to the UE 115-*a* via control signaling 215 (e.g., an RRC configuration, a medium access control-control element (MAC-CE), DCI, or some other control signaling 215).

Each CAPC may correspond to one or more LBT parameters, such as a contention window size, a defer period, an MCOT for the UE 115-*a*, one or more quality of service (QOS) parameters, or any combination thereof. For example, the UE 115-*a* may be configured with a table similar to Table 1 that defines a relationship between each CAPC and the one or more parameters. The UE 115-*a* may perform an LBT procedure and transmit the sidelink message in accordance with the one or more parameters based on the CAPC. In some examples, the contention window size may be inversely proportional to a value of the CAPC. That is, as the priority increases, the contention window size may decrease, which may reduce a duration of an LBT procedure to support faster channel access for high priority transmissions.

The UE 115-*a* may determine a maximum quantity of retransmissions permitted for the sidelink message based on the sidelink traffic priority and the CAPC. In some examples, the table may define the relationship between sidelink traffic priority and CAPC and a relationship between each sidelink traffic priority and a respective maximum quantity of retransmissions for the sidelink traffic priority. In such cases, the UE 115-*a* may determine the quantity of retransmissions for the sidelink message based on the priority of the sidelink message, the CAPC of the sidelink message, and the table. The UE 115-*a* may perform a quantity of one or more retransmissions that is less than or the same as the configured quantity for the priority of the sidelink message. If the sidelink message is not successfully transmitted after the configured quantity of retransmissions, the UE 115-*a* may drop the sidelink message and refrain from retransmitting the sidelink message for at least a delay period.

The UE 115-*a* may, in some examples, determine a quantity of sidelink resources (e.g., a reserved resource number) for transmitting or retransmitting the sidelink message based on the sidelink traffic priority, the CAPC or both. In some examples, the table may define a relationship between each sidelink traffic priority, a respective CAPC, and a configured reserved resource quantity (e.g., in addition to or as an alternative to defining the retransmission quantity per priority). The UE 115-*a* may transmit or retransmit the sidelink message via the configured quantity of sidelink resources or fewer than the configured quantity of sidelink resources for the priority of the sidelink message. Table 2 illustrates an example configuration of CAPCs, retransmission quantities, and reserved resource quantities for different sidelink traffic priorities.

TABLE 2

Per-Priority Sidelink Parameters

| Priority | CAPC | Maximum Retransmission Number | Reserved Resource Number |
|---|---|---|---|
| 0 | 1 | A (e.g., 32) | 3 |
| 1 | 1 | B (e.g., 16) | 3 |
| 2 | 2 | A (e.g., 32) | 3 |
| 3 | 2 | B (e.g., 16) | 3 |
| 4 | 3 | C (e.g., 8) | 2 |
| 5 | 3 | D (e.g., 4) | 2 |
| 6 | 4 | C (e.g., 8) | 2 |
| 7 | 4 | D (e.g., 4) | 2 |

Table 2 includes example retransmission quantities and reserved resource quantities configured for eight sidelink traffic priorities and four CAPCs. Although eight sidelink traffic priorities are mapped to four CAPCs in the example of Table 2, it is to be understood that a sidelink UE 115 may support any quantity of sidelink traffic priorities and CAPCs that may map to any quantity of retransmissions or reserved resources, including quantities different than those shown in Table 2. In some examples, a table configured for a UE 115 may include a different quantity of rows or columns than the Table 2. For example, the table may not include the reserved resource number column, or may include an additional column associated with a different parameter not shown in Table 2.

As depicted in Table 2, the quantity of retransmissions, the quantity of reserved resources, or both may be proportional to the sidelink traffic priority and a value of the CAPC. The configured retransmission and reserved resource quantities may increase as the sidelink traffic priority and the value of the CAPC increase (e.g., as a value of an index of the priority or the CAPC in the table decreases). The UE 115-*a* may thereby prioritize channel access and resource selection for higher priority transmissions over lower priority transmissions. For example, for a relatively low priority transmission (e.g., a sidelink message associated with a sidelink traffic priority index of seven and a CAPC index of four), the UE 115-*a* may perform relatively few retransmissions (e.g., eight or less) before dropping the transmission. The UE 115-*a* may reserve relatively few sidelink resources (e.g., two or less sidelink resources) for each transmission and retransmission of the sidelink message, which may provide for higher priority transmissions to occupy the channel more frequently and to use more sidelink resources than the low priority transmission. Such techniques may provide for reduced power consumption and processing for low priority transmissions.

The table may be configured for the UE 115-*a*, the UE 115-*b*, and one or more other sidelink UEs 115 (e.g., each sidelink UE 115 may share a same CAPC configuration table). The table may additionally or alternatively be configured for one or more other wireless devices that operate in the sidelink unlicensed band. In some examples, the table may be configured for communications according to the sidelink resource allocation mode 2, and a sidelink UE 115 that operates according to the sidelink resource allocation mode 1 may receive an indication of reserved resources for a sidelink transmission or retransmission from the base station 105-*a*.

In some examples, the UE 115-*a* may identify sidelink traffic including multiple sidelink messages to transmit to the UE 115-*b* or one or more other UEs 115. The sidelink traffic may be associated with two or more different priorities, CAPCs, or both. In such cases, the UE 115-*a* may transmit each sidelink message separately based on the respective CAPC and corresponding channel access parameters, or the UE 115-*a* may calculate a CAPC to use for transmitting the multiple sidelink messages concurrently or within a same COT. If the UE 115-*a* is configured to transmit each sidelink message separately, the UE 115-*a* may perform an LBT procedure and gain access to a channel for a different COT for each set of one or more sidelink messages that are associated with a same CAPC.

If the UE 115-*a* is configured to transmit the sidelink messages together, the UE 115-*a* or the base station 105-*a* may calculate a CAPC to use based on a function of one or more parameters associated with the multiple sidelink messages. The one or more parameters may include a packet delay budget (PDB), a reliability, a packet size, or any combination thereof for each set of one or more sidelink messages associated with a same priority (e.g., each priority traffic). The PDB may be inversely proportional to a value of an output of the function, and the packet size and reliability may be proportional to the value of the output of the function. That is, higher priority traffic may be associated with a larger output value than lower priority traffic. The UE 115-*a* or the base station 105-*a* may compare the output of the function with one or more threshold values to determine which priority to select.

If the base station 105-*a* calculates the CAPC, the UE 115-*a* may transmit signaling to the base station 105-*a* to indicate the priorities associated with the sidelink messages before the base station 105-*a* performs the calculation. The base station 105-*a* may transmit an indication of the determined CAPC to the UE 115-*a* after performing the calculation. Additionally or alternatively, the base station may transmit an indication of the output of the function and an indication of the one or more threshold values to the UE 115-*a*, and the UE 115-*a* may determine the CAPC based on the output and the threshold values. If the UE 115-*a* calculates the CAPC, the one or more threshold values may be indicated to the UE 115-*a* via control signaling 215, such as an RRC configuration (e.g., if the UE 115-*a* is in coverage of the network), or configured at the UE 115-*a* (e.g., preconfigured or defined in a standard).

In some examples, the one or more threshold values may include a first threshold value and a second threshold value. If the output of the function is greater than the first threshold value, the UE 115-*a* or the base station 105-*a* may select a highest CAPC from the set of CAPCs associated with the multiple sidelink messages. If the output of the function is less than the second threshold value, the UE 115-*a* or the base station 105-*a* may select a lowest CAPC from the set of CAPCs. If the output of the function is less than the first threshold value and greater than the second threshold value, the UE 115-*a* or the base station 105-*a* may select a CAPC that is in the middle of the set of CAPCs. The UE 115-*a* may perform an LBT procedure and transmit the multiple sidelink messages in a corresponding COT in accordance with the selected CAPC and corresponding sidelink channel access parameters associated with the selected CAPC (e.g., a contention window size, a defer period, a quantity of retransmissions, a quantity of reserved resources, or any combination thereof).

In some examples, the one or more threshold values may be adjusted or configured such that the lowest CAPC of the set of CAPCs is selected or such that the highest CAPC of the set of CAPCs is selected regardless of an output of the function. In such cases, there may be a common understanding between devices that support different RATs to support fair channel access between RATs. For example, the configured threshold values may be the same for each RAT.

A sidelink UE 115 may thereby be configured with one or more parameters for transmitting a sidelink message that are specific to a priority of the sidelink message, such as a maximum quantity of retransmissions, a maximum quantity of resources for each transmission, or both. As the priority of a sidelink transmission increases, the quantity of retransmissions and the quantity of resources may increase, which may provide for more frequent and more reliable channel access for higher priority transmissions than lower priority transmissions.

A sidelink UE 115 as described herein may additionally, or alternatively, determine a starting position for the sidelink message based on a priority of the sidelink message. Each UE 115 may be configured with one or more sets of starting positions for a sidelink transmission, and each set of starting positions may be specific to a priority of the sidelink transmission (e.g., priority-specific starting positions). The starting positions may indicate a time at which the UE 115 may finish an LBT procedure and attempt to access a channel. The starting positions may be relative to a COT for the UE 115. For example, the starting positions may correspond to one or more offsets relative to a beginning boundary of a first symbol of the COT for the UE 115. To prioritize channel access for high priority sidelink transmissions as described herein, higher priorities may be associated with starting positions that are earlier in time than starting positions configured for lower priorities.

Each sidelink UE 115 may receive control signaling 215 (e.g., RRC signaling, a MAC-CE, DCI, or some other control signaling) that indicates one or more sets of starting positions for the UE 115, for a resource pool supported by the UE 115, or both (e.g., a set of one or more starting positions with a configured gap in between each starting position, such as a 9 microsecond gap, or some other gap period). Additionally or alternatively, the one or more sets of starting positions may be defined at the UE 115. Each set of the one or more sets of starting positions may be associated with a respective sidelink traffic priority, a respective CAPC, or both. Such per-priority starting time configurations may be described in further detail elsewhere herein, including with reference to FIGS. 3A and 3B.

Figure 3A:
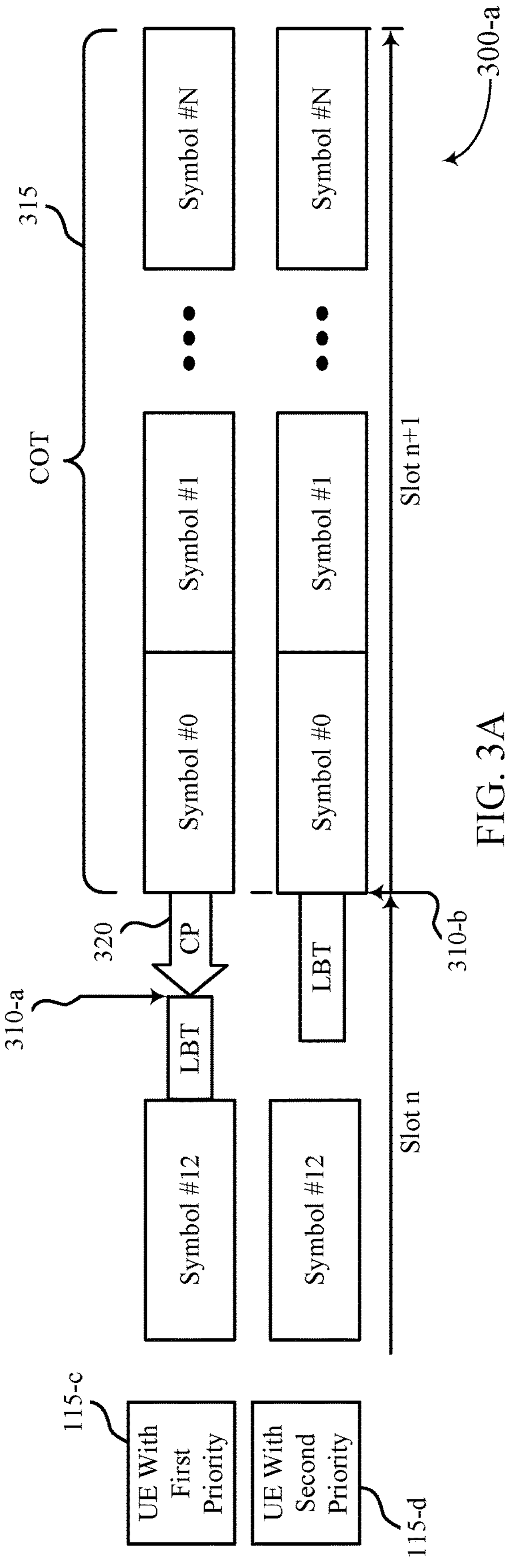
FIGS. 3A and 3B illustrate examples of sidelink channel access timelines that support channel access prioritization for high priority transmissions in accordance with aspects of the present disclosure.
Figure 3B:
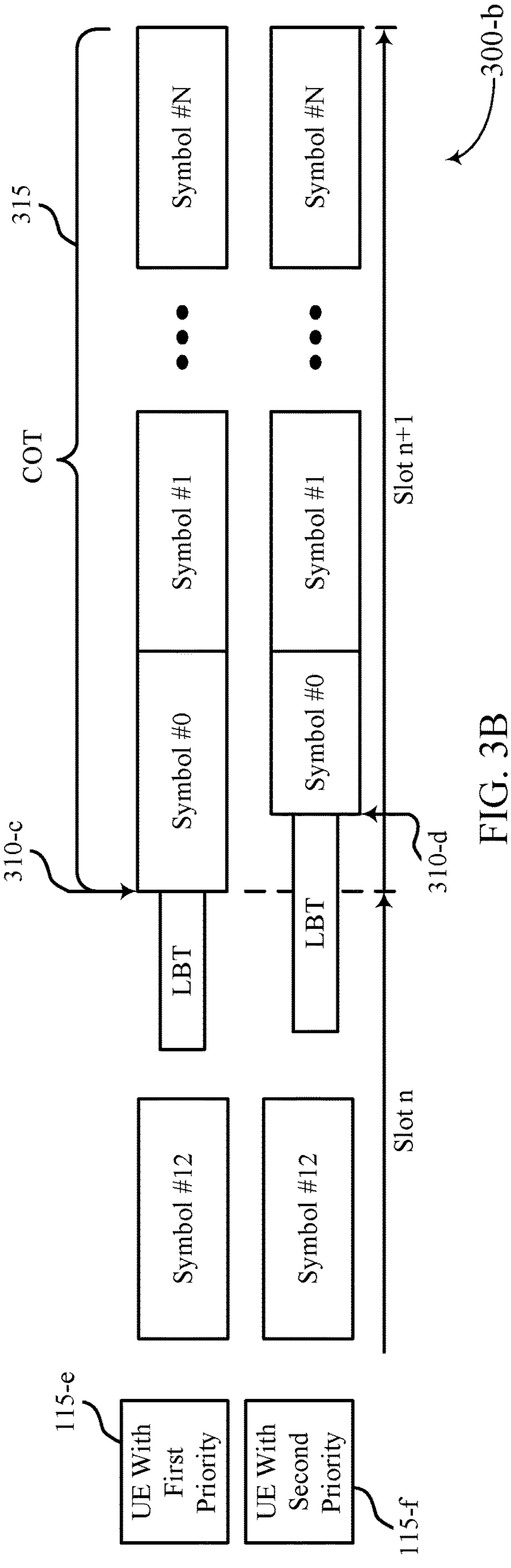

FIGS. 3A and 3B illustrate examples of sidelink channel access timelines 300-*a* and 300-*b* that support channel access prioritization for high priority transmissions in accordance with aspects of the present disclosure. The sidelink channel access timelines 300-*a* and 300-*b* may implement or be implemented by aspects of the wireless communications systems 100 and 200 as described with reference to FIGS. 1 and 2, respectively. For example, the sidelink channel access timelines 300-*a* and 300-*b* may each illustrate a channel access procedure performed by one or more of the sidelink UEs 115-*c*, 115-*d*, 115-*e*, and 115-*f*, which may each represent an example of a UE 115 as described with reference to FIGS. 1 and 2. In the example of FIGS. 3A and 3B, each UE 115 may perform an LBT procedure and attempt to access a channel during a COT 315 for the UE 115 based on a selected starting position 310.

Each of the UEs 115-*c*, 115-*d*, 115-*e*, and 115-*f* may be configured with multiple sets of starting positions, as described with reference to FIG. 2. For example, a UE 115 may receive a control signal (e.g., an RRC configuration) that indicates the multiple sets of starting positions, which may be configured per UE 115 (e.g., UE-specific sets of starting positions may, in some examples, be different for each sidelink UE 115) or per resource pool (e.g., resource pool-specific sets of starting positions may, in some examples, be different for each resource pool), and each set of starting positions of the multiple sets may be associated with a respective priority. Additionally or alternatively, the multiple sets of starting positions may be defined at the UE 115 (e.g., pre-defined). For example, the UE 115 may be configured with a table or other data structure that may be common to the UE 115 and one or more other UEs 115. The table may associate each priority with a respective set of starting positions (e.g., an offset value set). Alternatively, the relationship between each priority and respective set of starting positions may be standardized across the UEs 115.

As described herein, a first set of starting positions that is associated with a relatively high priority may include starting positions 310 that are prior to starting positions 310 of a second set that is associated with a lower priority. That is, an offset value set for a relatively high priority may include starting points that are relatively early in time (e.g., prior to a beginning boundary of a COT 315 for the UE 115), such that a UE 115 with a high priority message may obtain access to the channel earlier than other UEs 115. An offset value set for a relatively low priority may include starting points that are delayed or subsequent to a starting boundary of the COT 315 for the UE 115. In such cases, the UE 115 may monitor the channel longer to determine whether there are other, higher priority transmissions in the channel before accessing the channel to transmit the sidelink message.

The UE 115 may select a set of starting positions from the multiple sets of starting positions to use for transmitting a sidelink message based on a priority of the sidelink message. The UE 115 may randomly or pseudorandomly select a single starting position 310 from the selected set of starting positions. The starting position 310 may be relative to a COT 315 for the UE 115. The UE 115 may transmit the sidelink message at or after the selected starting position 310 if the LBT procedure has passed successfully prior to the starting position 310. In some examples, there may be a gap or a delay period between the starting position 310 and a first symbol of the COT 315 (e.g., a beginning boundary of a useful symbol for a waveform transmission). The UE 115 may fill the gap or delay period by transmitting an extended CP 320 or extending an LBT procedure.

FIG. 3A illustrates a first sidelink channel access timeline 300-*a*, in which the UE 115-*c* may transmit an extended CP 320 to fill a gap between the selected starting position 310-*a* and a beginning boundary of the COT 315 for the UE 115-*c*. The UE 115-*c* may be associated with a first priority that may be greater than a second priority associated with the UE 115-*d*. The first and second priorities may correspond to a sidelink traffic priority, a CAPC, or both associated with a first sidelink message or a second sidelink message to be transmitted by the UEs 115-*c* and 115-*d*, respectively. In one example, the first priority may correspond to a sidelink traffic priority with an index of one (e.g., priority number two) and the second priority may correspond to a sidelink traffic priority with an index of seven (e.g., priority number eight), as described with reference to Table 2.

The UEs 115-*c* and 115-*d* may each be configured with multiple sets of starting positions. The multiple sets of starting positions may be different for each of the UEs 115-*c* and 115-*d* (e.g., UE-specific) or the same for each of the UEs 115-*c* and 115-*d* (e.g., associated with a resource pool or common to each UE 115). The UE 115-*c* and the UE 115-*d* may each select a set of starting positions from the multiple sets of starting position based on the respective priorities of the UEs 115. A first set of starting positions selected by the UE 115-*c* may include starting positions that are prior to one or more starting positions of a second set of starting positions selected by the UE 115-*d* based on the UE 115-*c* being associated with a higher priority than the UE 115-*d*. The UE 115-*c* may randomly or pseudorandomly select the starting position 310-*a* from the first set of starting positions and the UE 115-*d* may randomly or pseudorandomly select the starting position 310-*b* from the second set of starting positions.

The UEs 115-*c* and 115-*d* may each perform an LBT procedure to determine whether a sidelink channel is available for a COT 315 configured for the UEs 115. One or more parameters associated with the LBT procedures may be based on the priority of the UEs 115 (e.g., a CAPC of the sidelink message), such as a contention window size, a delay period, or both, as described with reference to FIG. 2.

The UE 115-*c* may finish the LBT procedure prior to a beginning boundary of the COT 315 based on the selected starting position 310-*a*. If the LBT procedure is successful (e.g., if the UE 115-*c* identifies that the channel is not occupied for the COT 315), the UE 115-*c* may transmit an extended CP 320 at the starting position 310-*a* to reserve the wireless channel. The CP 320 may be an extension of a first symbol (e.g., symbol number zero) of the COT 315. The UE 115-*c* may transmit the first sidelink message during one or more sidelink resources of the first symbol within the COT 315 after transmitting the CP 320.

The UE 115-*d* may finish an LBT procedure later than the UE 115-*c* based on the starting position 310-*b* selected by the UE 115-*c* being later in time than the starting position 310-*a*. In some examples, the starting position 310-*b* may be aligned with a beginning boundary of the COT 315 (e.g., there may not be a starting time offset). In the example of FIG. 3A, the LBT procedure performed by the UE 115-*d* may fail due to the CP 320 transmitted by the UE 115-*c*. For example, the UE 115-*d* may determine that the channel is occupied based on the CP 320. As such, the UE 115-*d* may refrain from transmitting the second sidelink message at the starting position 310-*b* based on the failure of the LBT procedure. The UE 115-*d* may delay transmission of the sidelink message to another COT 315. In some other examples, (not pictured in FIG. 3), the LBT performed by the UE 115-*d* may succeed (e.g., there may not be a prior transmission in the channel), and the UE 115-*d* may transmit the second sidelink message at the starting position 310-*b*.

The UE 115-*c* may thereby transmit an extended CP 320 to reserve the wireless channel prior to the COT 315 based on a priority of the first sidelink message being relatively high. Other UEs 115 associated with lower priorities than the first sidelink message may select starting positions 310 that are later in time than the starting position 310-*a*, and the extended CP 320 transmitted at the starting position 310-*a* may cause one or more LBT procedures performed by the other UEs 115 to fail. Such techniques may provide for a sidelink UE 115 to prioritize channel access for relatively high priority transmissions.

FIG. 3B illustrates a second sidelink channel access timeline 300-*b* in which the UE 115-*f* may extend a duration of an LBT procedure to fill a delay period between a starting boundary of the COT 315 and a selected starting position 310-*d*. The UE 115-*e* may be associated with a first priority that may be greater than a second priority associated with the UE 115-*f*. The first and second priorities may represent examples of sidelink traffic priorities or CAPCs, as described with reference to FIG. 3A.

The UEs 115-*e* and 115-*f* may each be configured with multiple sets of starting positions, which may be different for each UE 115 or common to both the UEs 115-*e* and 115-*f*, as described with reference to FIG. 3A The UE 115-*e* and the UE 115-*f* may each select a set of starting positions from the multiple sets of starting position based on the respective priorities of the UEs 115. The set of starting positions selected by the UE 115-*e* may include starting positions that are prior to one or more starting positions of the set of starting positions selected by the UE 115-*f* based on the UE 115-*e* being associated with a higher priority than the UE 115-*f*. The UE 115-*e* may randomly or pseudorandomly select the starting position 310-*c* from the set of starting positions and the UE 115-*f* may randomly or pseudorandomly select the starting position 310-*d* from the set of starting positions. The starting position 310-*d* may be subsequent to the starting position 310-*c* in time.

The UEs 115-*e* and 115-*f* may each perform an LBT procedure in accordance with the respective priorities (e.g., CAPCs) of the UEs 115 to determine whether a sidelink channel is available for a COT 315 configured for the UEs 115. The UE 115-*e* may finish an LBT procedure at the same time as a beginning boundary of the COT 315 based on the selected starting position 310-*c*. If the LBT procedure is successful (e.g., the UE 115-*e* identifies that the channel is not occupied for the COT 315), the UE 115-*e* may transmit a first sidelink message during one or more sidelink resources of the first symbol within the COT 315.

The UE 115-*f* may finish an LBT procedure later than the UE 115-*e* based on the starting position 310-*d* selected by the UE 115-*f* being later in time than the starting position 310-*c*. The starting position 310-*d* may be subsequent to the beginning boundary of the COT 315. As such, the LBT procedure may partially puncture a first symbol (e.g., symbol number zero) in the COT 315.

In some examples, the LBT procedure performed by the UE 115-*f* may fail. For example, the UE 115-*f* may determine that the channel is occupied based on the first sidelink message transmitted by the UE 115-*e* at the starting position 310-*c*. As such, the UE 115-*f* may refrain from transmitting a second sidelink message at the starting position 310-*d* based on the failure of the LBT procedure. The UE 115-*f* may, in some examples, delay transmission of the sidelink message to another COT 315.

Figure 4:
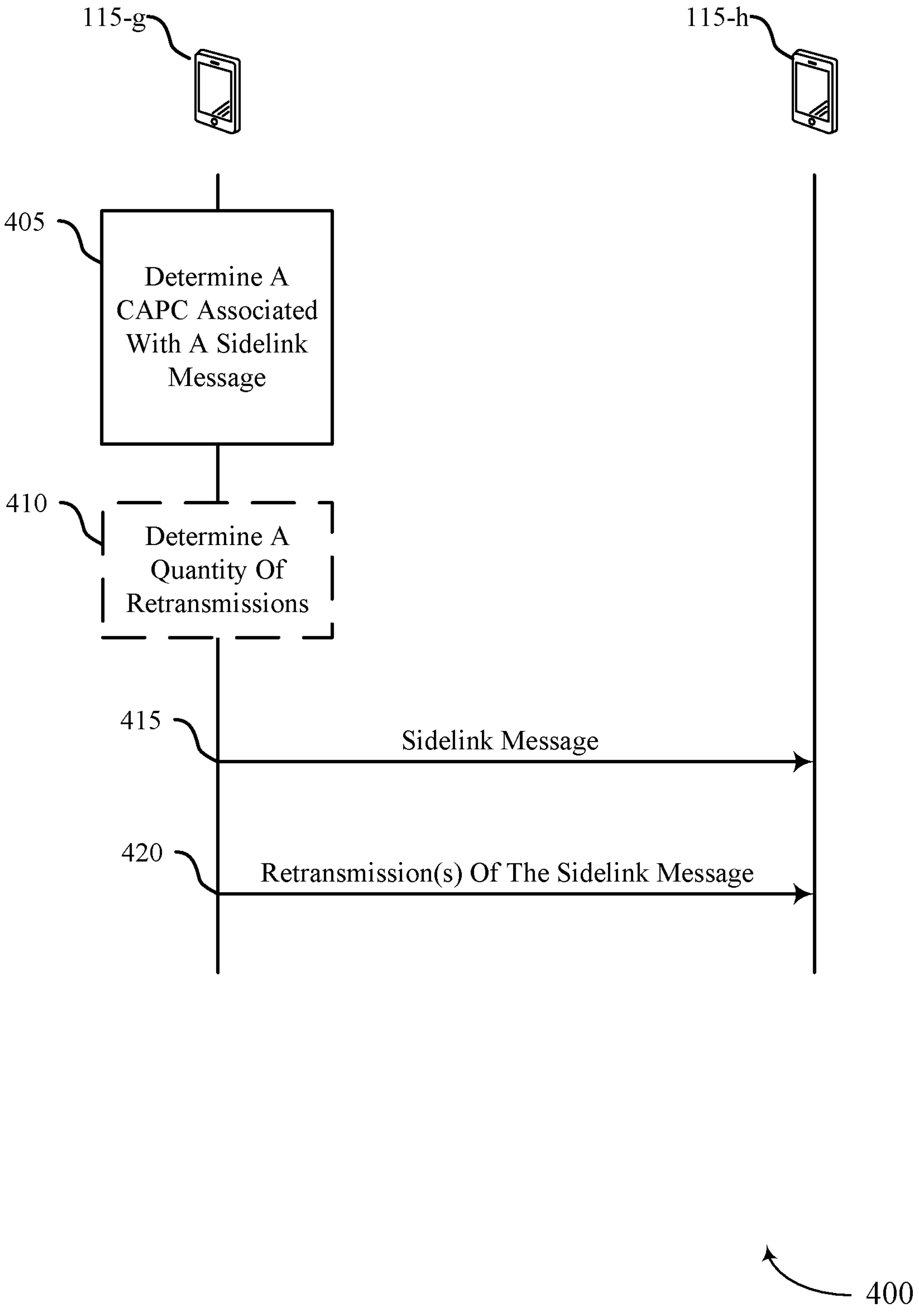
FIG. 4 illustrates an example of a process flow that supports channel access prioritization for high priority transmissions in accordance with aspects of the present disclosure.

In some other examples, the UE 115-*e* may not transmit the first sidelink message, or the starting position 310-*c* may be subsequent to the starting position 310-*d* in time (not pictured in FIG. 4). In such cases, if the UE 115-*f* does not identify other sidelink transmissions in the channel during the LBT procedure, the LBT procedure may succeed and the UE 115-*f* may transmit the second sidelink message at the starting position 310-*d*. That is, the UE 115-*f* may transmit the second sidelink message via one or more sidelink resources within the COT 315 after partially puncturing the first symbol of the COT 315 based on a success of the LBT procedure.

The described techniques may thereby support delayed starting positions 310 for low priority transmissions and earlier starting positions 310 for high priority transmissions. A delayed starting position 310 may provide for a sidelink UE 115 associated with a relatively low priority transmission to monitor a wireless channel for other sidelink transmissions that may be associated with higher priorities before obtaining access to the wireless channel. As such, the sidelink UEs 115 may reduce latency and improve reliability of high priority sidelink transmissions.

FIG. 4 illustrates an example of a process flow 400 that supports channel access prioritization for high priority transmissions in accordance with aspects of the present disclosure. The process flow 400 may implement or be implemented by aspects of the wireless communications systems 100 and 200 as described with reference to FIGS. 1 and 2, respectively. For example, the process flow 400 may implement or be implemented by a UE 115-*g* and a UE 115-*h*, which may be examples of UEs 115 as described with reference to FIGS. 1 through 3. In some examples, the UE 115-*g* may perform a quantity of retransmissions of a sidelink message based on a CAPC associated with the sidelink message.

In the following description of the process flow 400, the operations between the UE 115-*g* and the UE 115-*h* may be performed in different orders or at different times. Some operations may also be left out of the process flow 400, or other operations may be added. Although the UEs 115-*g* and 115-*h* are shown performing the operations of the process flow 400, some aspects of some operations may also be performed by one or more other wireless devices.

At 405, the UE 115-*g* may determine a CAPC associated with a sidelink message. The UE 115-*g* may determine the CAPC associated with the sidelink message based on a priority of the sidelink message (e.g., a sidelink traffic priority). In some examples, the UE 115-*g* may be configured with a table or other data structure that may indicate a relationship between each sidelink traffic priority and a respective CAPC, and the UE 115-*g* may determine the CAPC based on the table. The CAPC may correspond to a contention window size for the sidelink message.

At 410, in some examples, the UE 115-*g* may determine a quantity of one or more retransmissions of the sidelink message based on the CAPC. In some examples, the table may indicate a relationship between each sidelink traffic priority, each CAPC, or both, and a respective quantity of retransmissions, and the UE 115-*g* may determine the quantity of one or more retransmissions for the sidelink message based on the table. In some examples, the quantity of the one or more retransmissions may be proportional to the priority and a value of the CAPC.

At 415, the UE 115-*g* may transmit the sidelink message to the UE 115-*h* via one or more sidelink resources. The UE 115-*g* may transmit the sidelink message based on an LBT procedure performed by the UE 115-*g*. For example, the UE 115-*g* may obtain access to a channel for at least a COT based on a success of the LBT procedure, and the UE 115-*g* may transmit the sidelink message via the one or more sidelink resources during the COT. In some examples, the UE 115-*g* may determine a quantity of the one or more sidelink resources based on the CAPC. The quantity of the one or more sidelink resources may be proportional to a value of the CAPC.

At 420, the UE 115-*g* may perform one or more retransmissions of the sidelink message. The UE 115-*g* may retransmit the sidelink message to the UE 115-*h* a quantity of one or more times. The quantity of one or more retransmissions may be based on the CAPC (e.g., as determined at 410).

Figure 5:
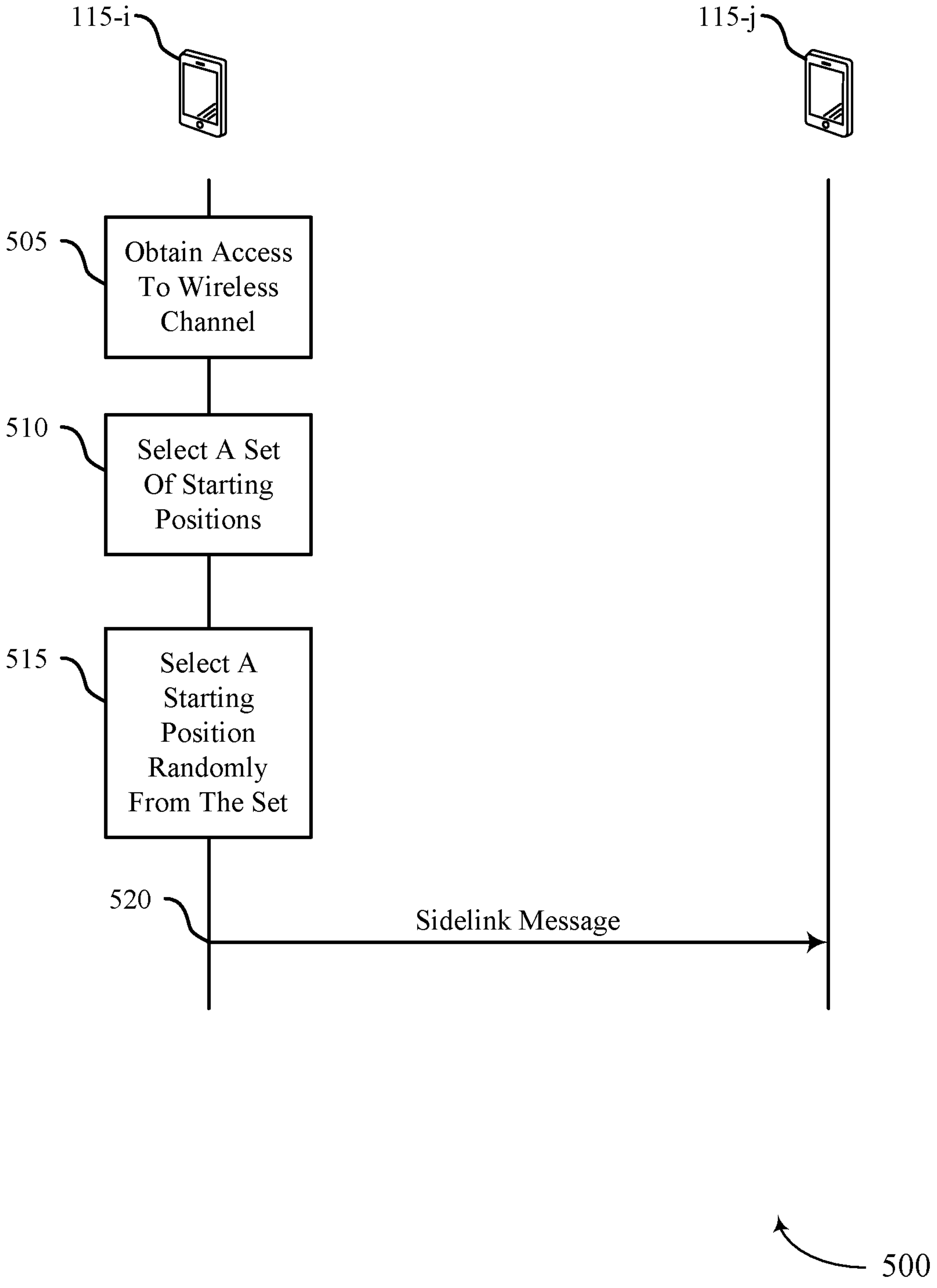
FIG. 5 illustrates an example of a process flow that supports channel access prioritization for high priority transmissions in accordance with aspects of the present disclosure.

FIG. 5 illustrates an example of a process flow 500 that supports channel access prioritization for high priority transmissions in accordance with aspects of the present disclosure. The process flow 500 may implement or be implemented by aspects of the wireless communications systems 100 and 200 as described with reference to FIGS. 1 and 2, respectively. For example, the process flow 500 may implement or be implemented by a UE 115-*i* and a UE 115-*j*, which may be examples of UEs 115 as described with reference to FIGS. 1 through 4. In some examples, the UE 115-*i* may transmit a sidelink message at a starting position based on a priority of the sidelink message.

In the following description of the process flow 500, the operations between the UE 115-*i* and the UE 115-*j* may be performed in different orders or at different times. Some operations may also be left out of the process flow 500, or other operations may be added. Although the UEs 115-*i* and 115-*j* are shown performing the operations of the process flow 500, some aspects of some operations may also be performed by one or more other wireless devices.

At 505, the UE 115-*i* may obtain access to a wireless channel for a COT. The UE 115-*i* may obtain access to the wireless channel in accordance with an LBT procedure performed by the UE 115-*i*.

At 510, the UE 115-*i* may select a set of starting positions from multiple sets of starting positions for transmitting a sidelink message. The UE 115-*i* may select the starting position based on a priority of the sidelink message. Each set of starting positions of the multiple sets of starting positions may be associated with a respective priority.

At 515, the UE 115-*i* may select a starting position with respect to the COT randomly or pseudorandomly from the set of starting positions. In some examples, the UE 115-*i* may complete the LBT procedure at the selected starting position.

At 520, the UE 115-*i* may transmit the sidelink message to the UE 115-*j*. The UE 115-*i* may transmit the sidelink message via the wireless channel and within the COT in accordance with the starting position and the LBT procedure. For example, the UE 115-*i* may transmit the sidelink message based on a success of the LBT procedure.

Figure 6:
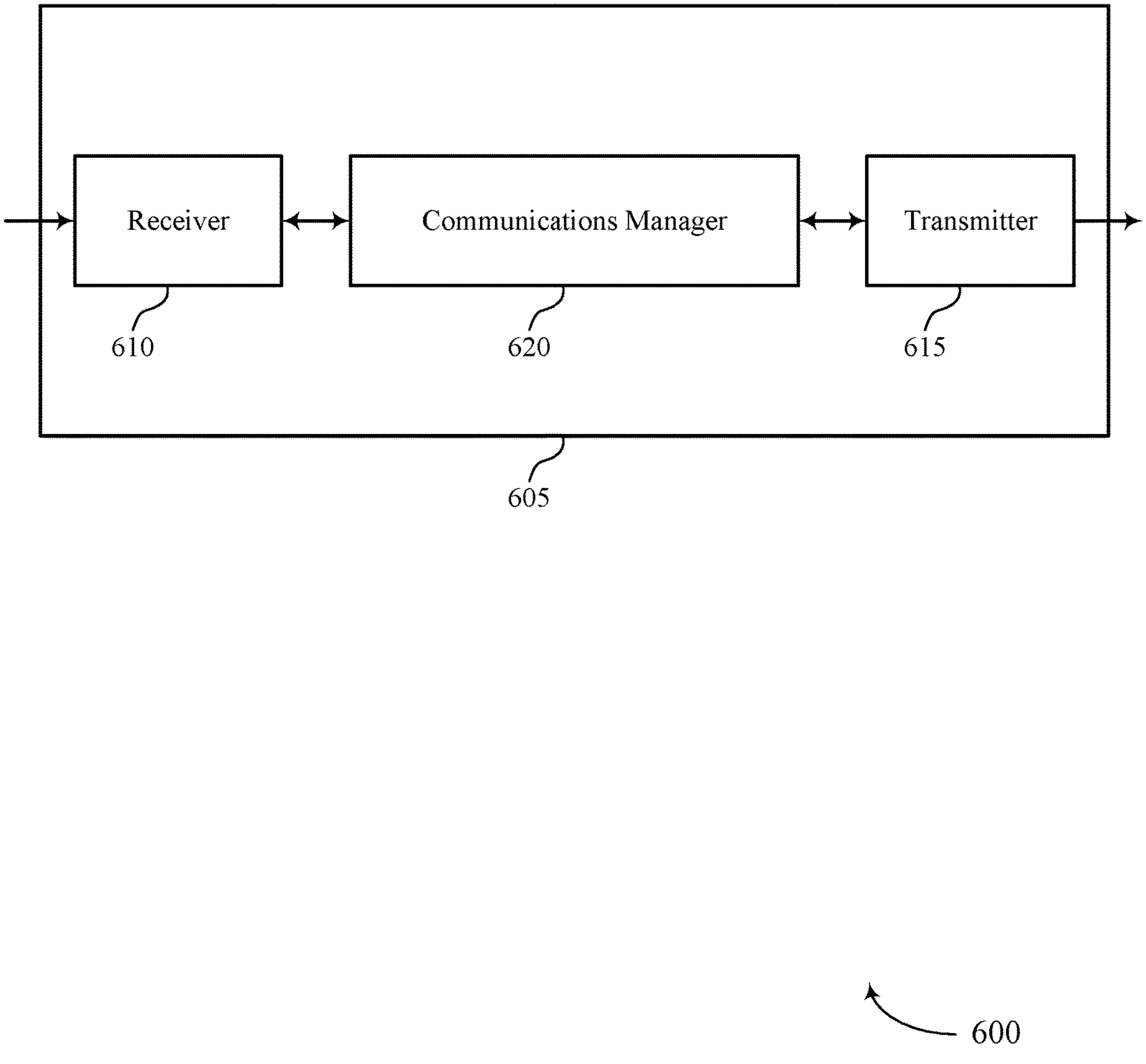
FIGS. 6 and 7 show block diagrams of devices that support channel access prioritization for high priority transmissions in accordance with aspects of the present disclosure.

FIG. 6 shows a block diagram 600 of a device 605 that supports channel access prioritization for high priority transmissions in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel access prioritization for high priority transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel access prioritization for high priority transmissions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of channel access prioritization for high priority transmissions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for determining a CAPC associated with a sidelink message based on a priority of the sidelink message. The communications manager 620 may be configured as or otherwise support a means for transmitting the sidelink message via one or more sidelink resources based on an LBT procedure performed by the UE. The communications manager 620 may be configured as or otherwise support a means for performing one or more retransmissions of the sidelink message, where a quantity of the one or more retransmissions is based on the CAPC and the priority of the sidelink message.

Additionally or alternatively, the communications manager 620 may support wireless communication at a UE in accordance with examples as disclosed herein. For example, the communications manager 620 may be configured as or otherwise support a means for obtaining access to a wireless channel for a COT in accordance with an LBT procedure. The communications manager 620 may be configured as or otherwise support a means for selecting, from a set of multiple sets of starting positions, a set of starting positions for transmitting a sidelink message based on a priority of the sidelink message, where each set of starting positions of the set of multiple sets of starting positions is associated with a respective priority. The communications manager 620 may be configured as or otherwise support a means for selecting a starting position with respect to the COT randomly or pseudorandomly from the set of starting positions. The communications manager 620 may be configured as or otherwise support a means for transmitting the sidelink message via the wireless channel and within the COT in accordance with the starting position and the LBT procedure.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption and more efficient utilization of communication resources. For example, by identifying a quantity of retransmissions, a quantity of reserved resources, a set of starting positions, or any combination thereof per sidelink traffic priority, the processor of the device 605 may prioritize channel access for high priority transmissions. The quantity of retransmissions and the quantity of reserved resources may decrease as priority decreases, such that the processor may reduce power consumption, processing, and resource utilization for low priority transmissions. The starting positions may occur earlier in time as the priority increases, which may provide for the processor to prioritize channel access and resource utilization for higher priority transmissions and refrain from transmitting lower priority transmissions (e.g., based on a failure of an LBT procedure due to an earlier transmission on the channel). Such techniques may thereby reduce processing and improve performance and reliability of sidelink communications on a sidelink unlicensed band.

Figure 7:
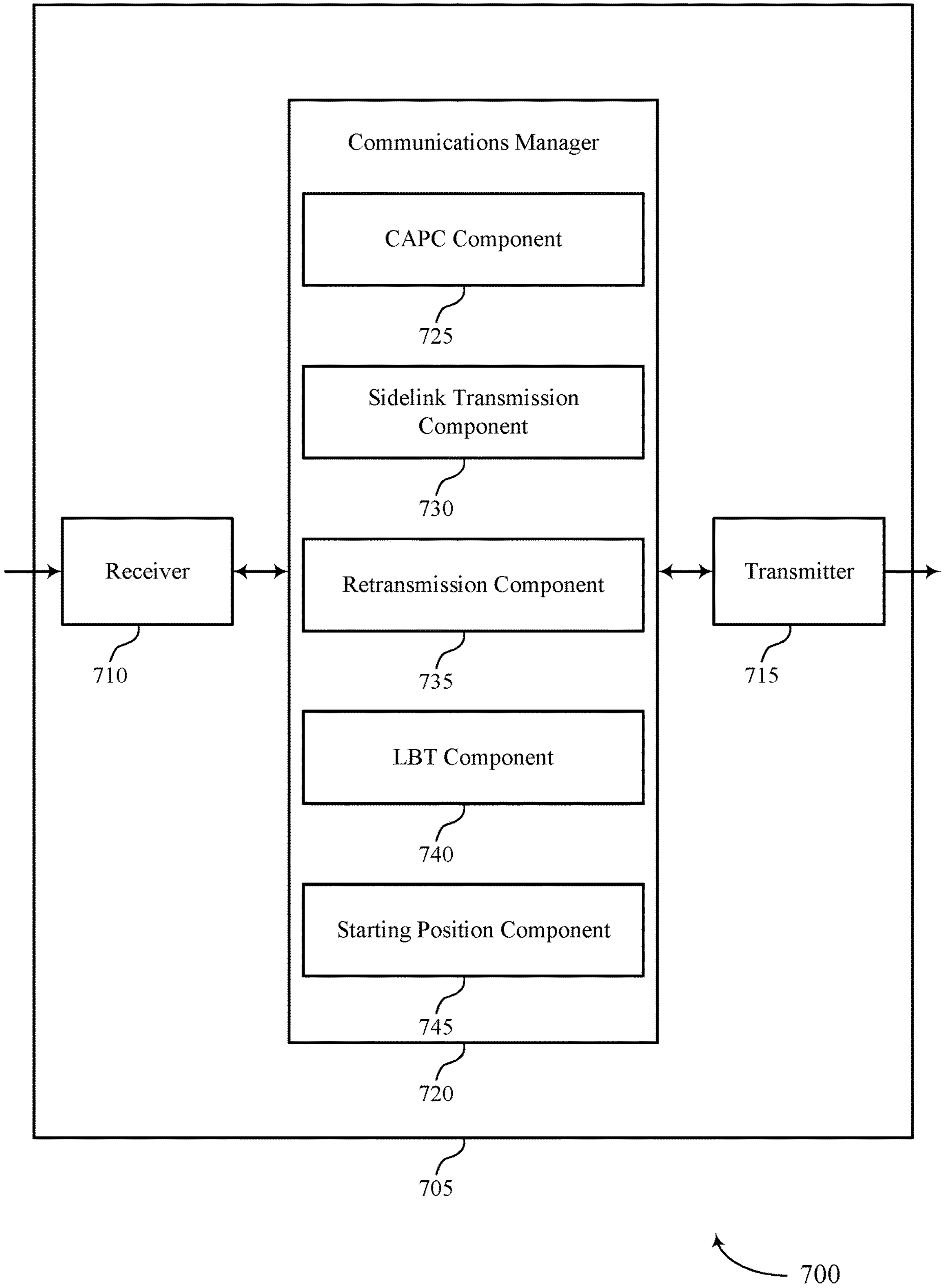

FIG. 7 shows a block diagram 700 of a device 705 that supports channel access prioritization for high priority transmissions in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to channel access prioritization for high priority transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to channel access prioritization for high priority transmissions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of channel access prioritization for high priority transmissions as described herein. For example, the communications manager 720 may include a CAPC component 725, a sidelink transmission component 730, a retransmission component 735, an LBT component 740, a starting position component 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The CAPC component 725 may be configured as or otherwise support a means for determining a CAPC associated with a sidelink message based on a priority of the sidelink message. The sidelink transmission component 730 may be configured as or otherwise support a means for transmitting the sidelink message via one or more sidelink resources based on an LBT procedure performed by the UE. The retransmission component 735 may be configured as or otherwise support a means for performing one or more retransmissions of the sidelink message, where a quantity of the one or more retransmissions is based on the CAPC and the priority of the sidelink message.

Additionally or alternatively, the communications manager 720 may support wireless communication at a UE in accordance with examples as disclosed herein. The LBT component 740 may be configured as or otherwise support a means for obtaining access to a wireless channel for a COT in accordance with an LBT procedure. The starting position component 745 may be configured as or otherwise support a means for selecting, from a set of multiple sets of starting positions, a set of starting positions for transmitting a sidelink message based on a priority of the sidelink message, where each set of starting positions of the set of multiple sets of starting positions is associated with a respective priority. The starting position component 745 may be configured as or otherwise support a means for selecting a starting position with respect to the COT randomly or pseudorandomly from the set of starting positions. The sidelink transmission component 730 may be configured as or otherwise support a means for transmitting the sidelink message via the wireless channel and within the COT in accordance with the starting position and the LBT procedure.

Figure 8:
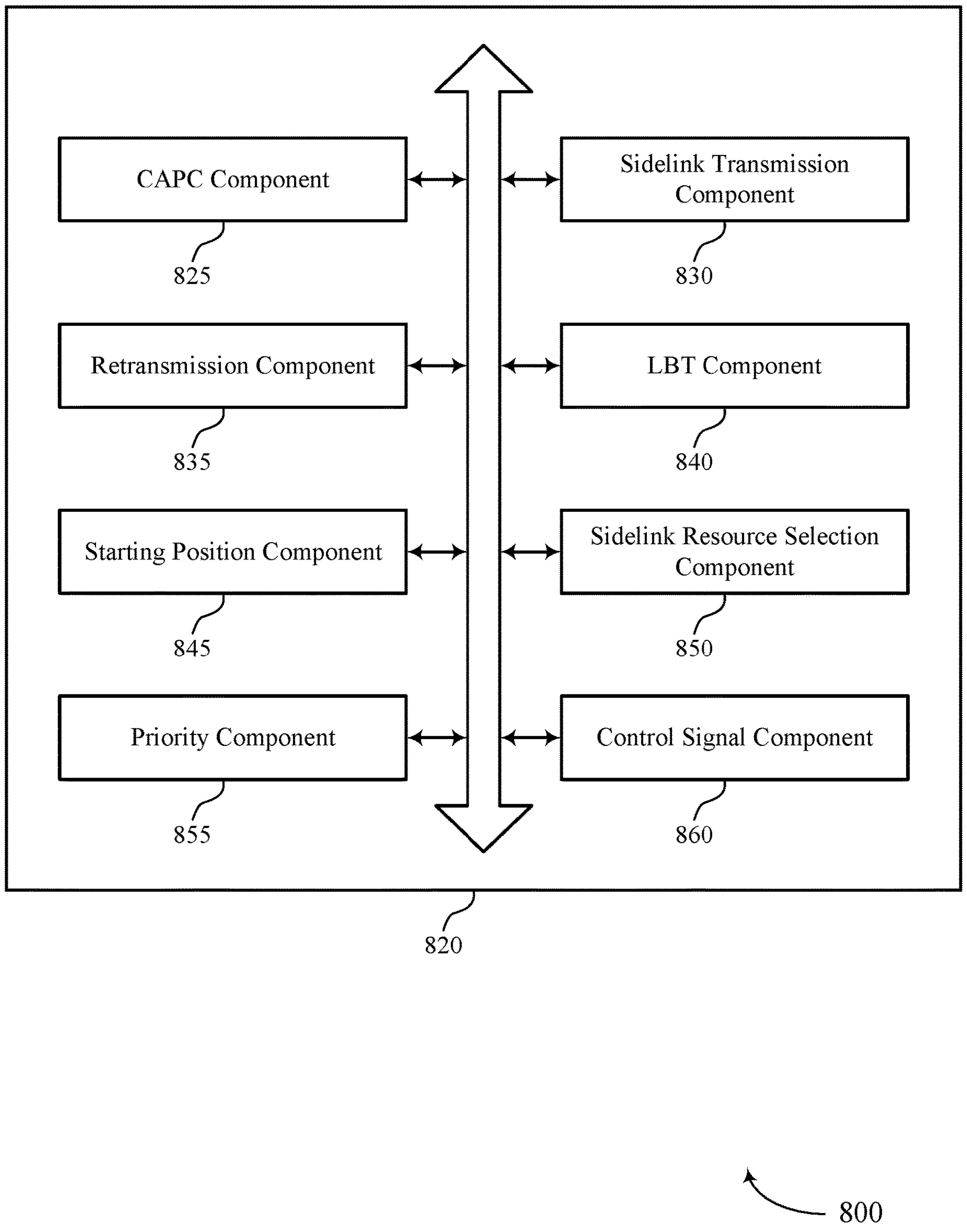
FIG. 8 shows a block diagram of a communications manager that supports channel access prioritization for high priority transmissions in accordance with aspects of the present disclosure.

FIG. 8 shows a block diagram 800 of a communications manager 820 that supports channel access prioritization for high priority transmissions in accordance with aspects of the present disclosure. The communications manager 820 may be an example of aspects of a communications manager 620, a communications manager 720, or both, as described herein. The communications manager 820, or various components thereof, may be an example of means for performing various aspects of channel access prioritization for high priority transmissions as described herein. For example, the communications manager 820 may include a CAPC component 825, a sidelink transmission component 830, a retransmission component 835, an LBT component 840, a starting position component 845, a sidelink resource selection component 850, a priority component 855, a control signal component 860, or any combination thereof. Each of these components may communicate, directly or indirectly, with one another (e.g., via one or more buses).

The communications manager 820 may support wireless communication at a UE in accordance with examples as disclosed herein. The CAPC component 825 may be configured as or otherwise support a means for determining a CAPC associated with a sidelink message based on a priority of the sidelink message. The sidelink transmission component 830 may be configured as or otherwise support a means for transmitting the sidelink message via one or more sidelink resources based on an LBT procedure performed by the UE. The retransmission component 835 may be configured as or otherwise support a means for performing one or more retransmissions of the sidelink message, where a quantity of the one or more retransmissions is based on the CAPC and the priority of the sidelink message.

In some examples, the sidelink resource selection component 850 may be configured as or otherwise support a means for determining a quantity of the one or more sidelink resources based on the CAPC and the priority of the sidelink message, where the quantity of the one or more sidelink resources may be proportional to a value of the CAPC. In some examples, the quantity of the one or more retransmissions may be proportional to a value of the CAPC.

In some examples, the sidelink transmission component 830 may be configured as or otherwise support a means for transmitting a second sidelink message via one or more second sidelink resources based on a second CAPC associated with the second sidelink message, where the second sidelink message and the sidelink message may be transmitted separately based on the second CAPC being different than the CAPC.

In some examples, the priority component 855 may be configured as or otherwise support a means for determining a set of multiple priorities of a set of multiple sidelink messages including at least the sidelink message. In some examples, the CAPC component 825 may be configured as or otherwise support a means for determining the CAPC for transmitting the set of multiple sidelink messages based on one or more parameters associated with the set of multiple sidelink messages, the one or more parameters including a PDB, a reliability, a packet size, or any combination thereof associated with each sidelink message of the set of multiple sidelink messages. In some examples, the sidelink transmission component 830 may be configured as or otherwise support a means for transmitting the set of multiple sidelink messages based on the CAPC.

In some examples, the control signal component 860 may be configured as or otherwise support a means for receiving a control signal that indicates a configuration of one or more threshold values for selecting the CAPC. In some examples, the CAPC component 825 may be configured as or otherwise support a means for selecting the CAPC based on the one or more threshold values, where the CAPC may be a maximum CAPC of a set of multiple CAPCs associated with the set of multiple sidelink messages or a minimum CAPC of the set of multiple CAPCs based on the configuration of the one or more threshold values.

In some examples, the CAPC component 825 may be configured as or otherwise support a means for determining one or more threshold values for selecting the CAPC. In some examples, the CAPC component 825 may be configured as or otherwise support a means for selecting the CAPC based on the one or more threshold values, where the CAPC may be a maximum CAPC of a set of multiple CAPCs associated with the set of multiple sidelink messages or a minimum CAPC of the set of multiple CAPCs based on a configuration of the one or more threshold values.

In some examples, the priority component 855 may be configured as or otherwise support a means for transmitting, to a base station, a signal that indicates a set of multiple priorities of a set of multiple sidelink messages including at least the sidelink message and one or more parameters associated with the set of multiple sidelink messages. In some examples, the CAPC component 825 may be configured as or otherwise support a means for receiving, from the base station, an indication of the CAPC for transmitting the set of multiple sidelink messages based on the one or more parameters, where the one or more parameters may include a PDB, a reliability, a packet size, or any combination thereof associated with each sidelink message of the set of multiple sidelink messages. In some examples, the sidelink transmission component 830 may be configured as or otherwise support a means for transmitting the set of multiple sidelink messages based on the CAPC. In some examples, the CAPC for the sidelink message corresponds to a contention window size for the sidelink message.

Additionally or alternatively, the communications manager 820 may support wireless communication at a UE in accordance with examples as disclosed herein. The LBT component 840 may be configured as or otherwise support a means for obtaining access to a wireless channel for a COT in accordance with an LBT procedure. The starting position component 845 may be configured as or otherwise support a means for selecting, from a set of multiple sets of starting positions, a set of starting positions for transmitting a sidelink message based on a priority of the sidelink message, where each set of starting positions of the set of multiple sets of starting positions is associated with a respective priority. In some examples, the starting position component 845 may be configured as or otherwise support a means for selecting a starting position with respect to the COT randomly or pseudorandomly from the set of starting positions. In some examples, the sidelink transmission component 830 may be configured as or otherwise support a means for transmitting the sidelink message via the wireless channel and within the COT in accordance with the starting position and the LBT procedure.

In some examples, to support selecting the set of starting positions, the control signal component 860 may be configured as or otherwise support a means for receiving control signaling that indicates the set of multiple sets of starting positions for the UE. In some examples, to support selecting the set of starting positions, the starting position component 845 may be configured as or otherwise support a means for selecting the set of starting positions from the set of multiple sets of starting positions for the UE based on the priority of the sidelink message.

In some examples, to support selecting the set of starting positions, the control signal component 860 may be configured as or otherwise support a means for receiving control signaling that indicates the set of multiple sets of starting positions for a resource pool, where the sidelink message may be transmitted via one or more sidelink resources of the resource pool. In some examples, to support selecting the set of starting positions, the starting position component 845 may be configured as or otherwise support a means for selecting the set of starting positions from the set of multiple sets of starting positions for the resource pool based on the priority of the sidelink message.

In some examples, to support transmitting the sidelink message, the sidelink transmission component 830 may be configured as or otherwise support a means for transmitting an extended CP at the starting position based on a success of the LBT procedure, where the extended CP may reserve the wireless channel for the sidelink message. In some examples, to support transmitting the sidelink message, the sidelink transmission component 830 may be configured as or otherwise support a means for transmitting the sidelink message in a first symbol subsequent to the extended CP.

In some examples, to support transmitting the sidelink message, the LBT component 840 may be configured as or otherwise support a means for extending a duration of the LBT procedure based on the starting position, where the extended duration of the LBT procedure may puncture a first symbol of the COT for the UE. In some examples, to support transmitting the sidelink message, the sidelink transmission component 830 may be configured as or otherwise support a means for transmitting the sidelink message via a portion of the first symbol that is subsequent to the starting position based on a success of the LBT procedure.

In some examples, the priority of the sidelink message may be greater than a second priority associated with a second set of starting positions of the set of multiple sets of starting positions. In some examples, each starting position of the set of starting positions may be prior to each starting position of the second set of starting positions in time based on the priority associated with the set of starting positions being greater than the second priority associated with the second set of starting positions. In some examples, the priority of the sidelink message may correspond to a CAPC or a sidelink traffic priority.

Figure 9:
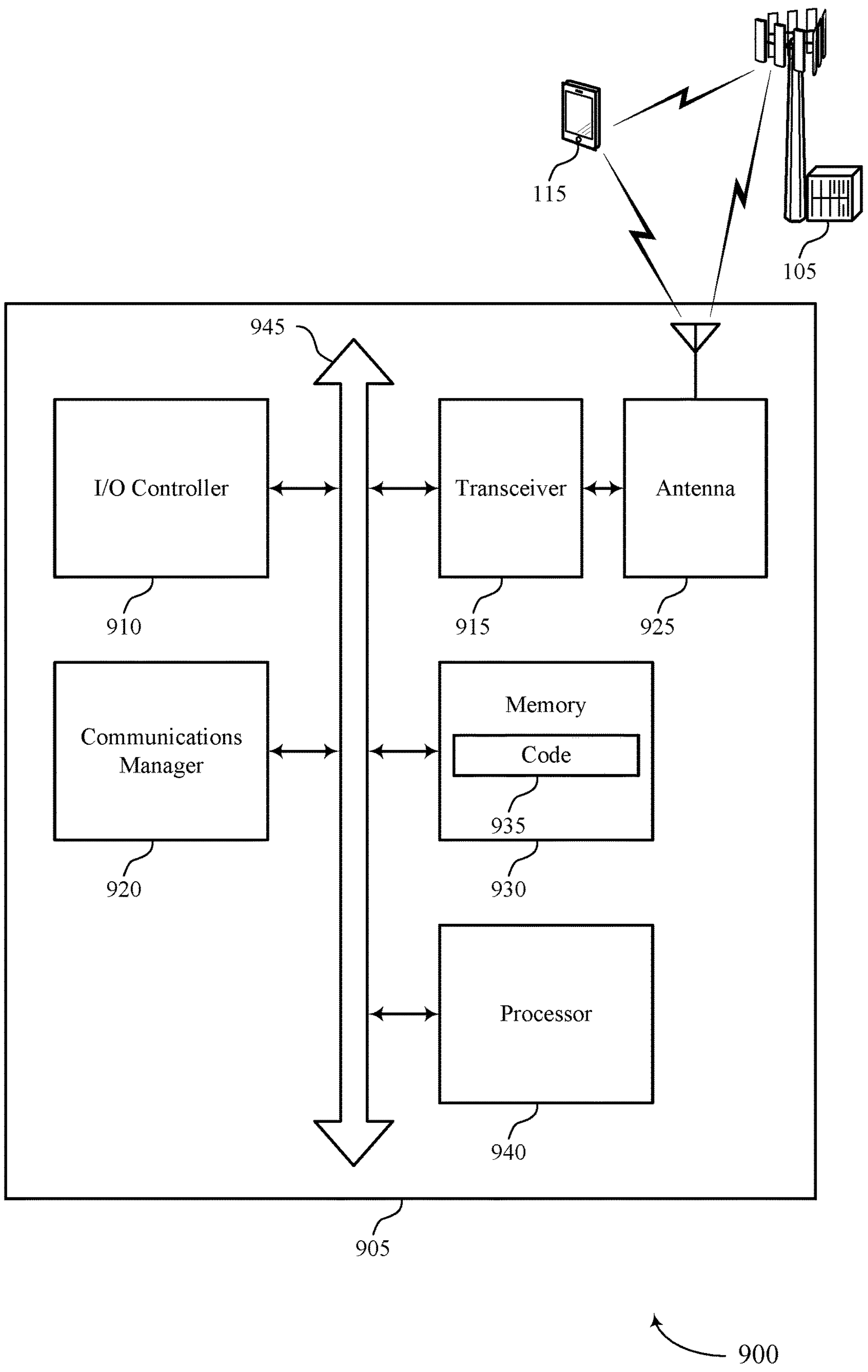
FIG. 9 shows a diagram of a system including a device that supports channel access prioritization for high priority transmissions in accordance with aspects of the present disclosure.

FIG. 9 shows a diagram of a system 900 including a device 905 that supports channel access prioritization for high priority transmissions in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting channel access prioritization for high priority transmissions). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for determining a CAPC associated with a sidelink message based on a priority of the sidelink message. The communications manager 920 may be configured as or otherwise support a means for transmitting the sidelink message via one or more sidelink resources based on an LBT procedure performed by the UE. The communications manager 920 may be configured as or otherwise support a means for performing one or more retransmissions of the sidelink message, where a quantity of the one or more retransmissions is based on the CAPC and the priority of the sidelink message.

Additionally or alternatively, the communications manager 920 may support wireless communication at a UE in accordance with examples as disclosed herein. For example, the communications manager 920 may be configured as or otherwise support a means for obtaining access to a wireless channel for a COT in accordance with an LBT procedure. The communications manager 920 may be configured as or otherwise support a means for selecting, from a set of multiple sets of starting positions, a set of starting positions for transmitting a sidelink message based on a priority of the sidelink message, where each set of starting positions of the set of multiple sets of starting positions is associated with a respective priority. The communications manager 920 may be configured as or otherwise support a means for selecting a starting position with respect to the COT randomly or pseudorandomly from the set of starting positions. The communications manager 920 may be configured as or otherwise support a means for transmitting the sidelink message via the wireless channel and within the COT in accordance with the starting position and the LBT procedure.

By including or configuring the communications manager 920 in accordance with examples as described herein, the device 905 may support techniques for improved communication reliability, reduced latency, reduced power consumption, more efficient utilization of communication resources, and improved coordination between devices. The device 905 may be configured with a quantity of retransmissions, a quantity of reserved resources, a set of starting positions, or any combination thereof that may each be specific to a sidelink traffic priority, a CAPC, or both. The quantity of retransmissions and the quantity of reserved resources may increase as the priority increases, which may provide for the device 905 to prioritize channel access for high priority transmissions to improve communication reliability. The device 905 may perform fewer retransmissions or transmit in fewer resources for low priority transmissions, which may reduce power consumption and latency and improve utilization of the sidelink resources.

The starting positions may be located earlier in time for higher priority transmissions than lower priority transmissions, such that the device 905 may reserve channel access earlier for the higher priority transmissions, which may reduce latency and improve communication reliability. The device 905 may delay a transmission of a lower priority transmission to determine whether other, higher priority sidelink devices are accessing the channel, which may improve coordination between devices and improve reliability of the sidelink communications. The device 905 may thereby support more efficient and prioritized channel access for higher priority transmissions than lower priority transmissions to improve sidelink communications on a sidelink unlicensed band.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of channel access prioritization for high priority transmissions as described herein, or the processor 940 and the memory 930 may be otherwise configured to perform or support such operations.

Figure 10:
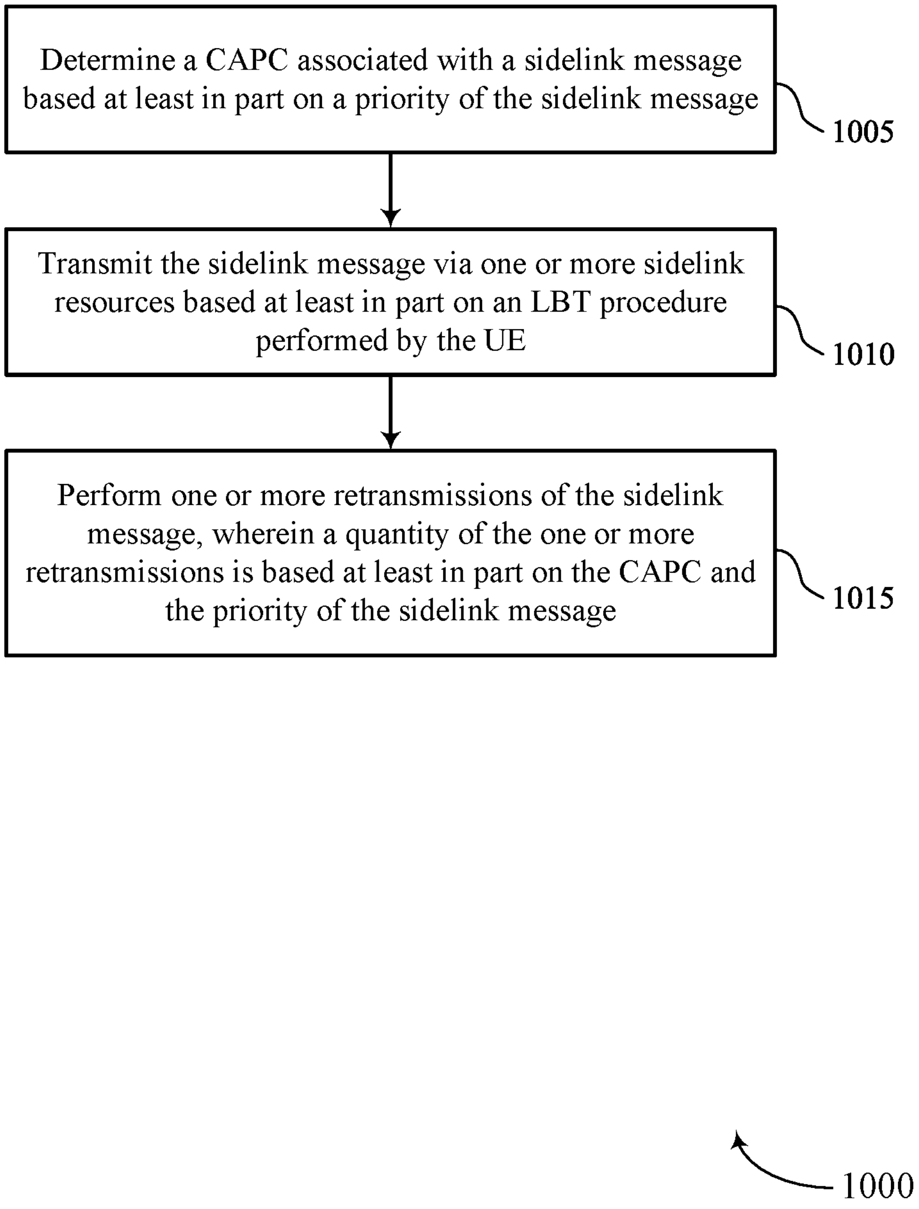
FIGS. 10 through 14 show flowcharts illustrating methods that support channel access prioritization for high priority transmissions in accordance with aspects of the present disclosure.

FIG. 10 shows a flowchart illustrating a method 1000 that supports channel access prioritization for high priority transmissions in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include determining a CAPC associated with a sidelink message based on a priority of the sidelink message. The operations of 1005 may be performed in accordance with examples as disclosed herein. In some examples, aspects of the operations of 1005 may be performed by a CAPC component 825 as described with reference to FIG. 8.

At 1010, the method may include transmitting the sidelink message via one or more sidelink resources based on an LBT procedure performed by the UE. The operations of 1010 may be performed in accordance with examples as disclosed herein. In some examples, aspects of the operations of 1010 may be performed by a sidelink transmission component 830 as described with reference to FIG. 8.

At 1015, the method may include performing one or more retransmissions of the sidelink message, where a quantity of the one or more retransmissions is based on the CAPC and the priority of the sidelink message. The operations of 1015 may be performed in accordance with examples as disclosed herein. In some examples, aspects of the operations of 1015 may be performed by a retransmission component 835 as described with reference to FIG. 8.

Figure 11:
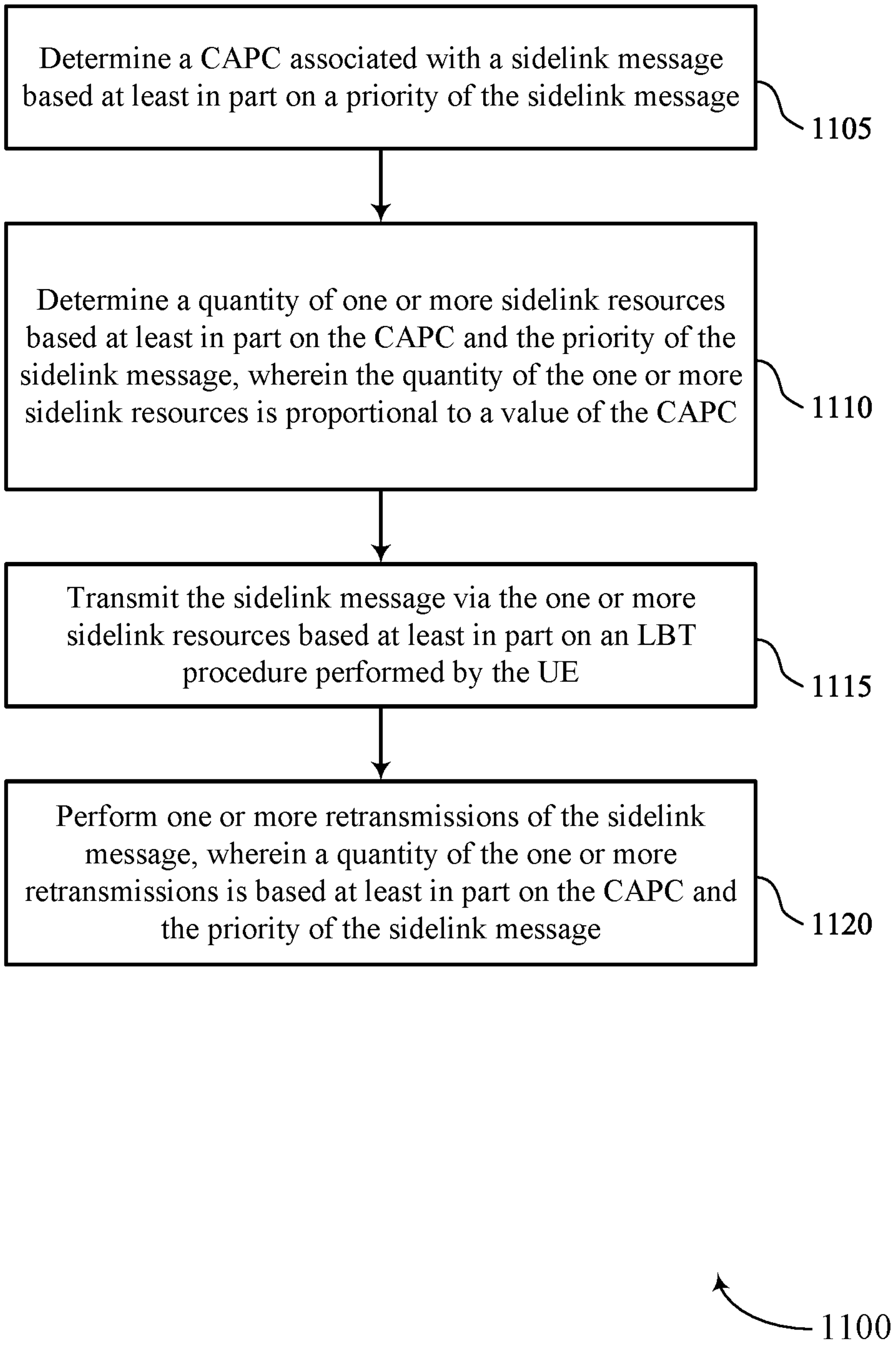

FIG. 11 shows a flowchart illustrating a method 1100 that supports channel access prioritization for high priority transmissions in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include determining a CAPC associated with a sidelink message based on a priority of the sidelink message. The operations of 1105 may be performed in accordance with examples as disclosed herein. In some examples, aspects of the operations of 1105 may be performed by a CAPC component 825 as described with reference to FIG. 8.

At 1110, the method may include determining a quantity of one or more sidelink resources for transmitting the sidelink message based on the CAPC and the priority of the sidelink message, where the quantity of the one or more sidelink resources may be proportional to a value of the CAPC. The operations of 1110 may be performed in accordance with examples as disclosed herein. In some examples, aspects of the operations of 1110 may be performed by a sidelink resource selection component 850 as described with reference to FIG. 8.

At 1115, the method may include transmitting the sidelink message via the one or more sidelink resources based on an LBT procedure performed by the UE. The operations of 1115 may be performed in accordance with examples as disclosed herein. In some examples, aspects of the operations of 1115 may be performed by a sidelink transmission component 830 as described with reference to FIG. 8.

At 1120, the method may include performing a quantity of one or more retransmissions of the sidelink message, wherein the quantity of the one or more retransmissions may be based on the CAPC and the priority of the sidelink message. The operations of 1120 may be performed in accordance with examples as disclosed herein. In some examples, aspects of the operations of 1120 may be performed by a retransmission component 835 as described with reference to FIG. 8.

Figure 12:
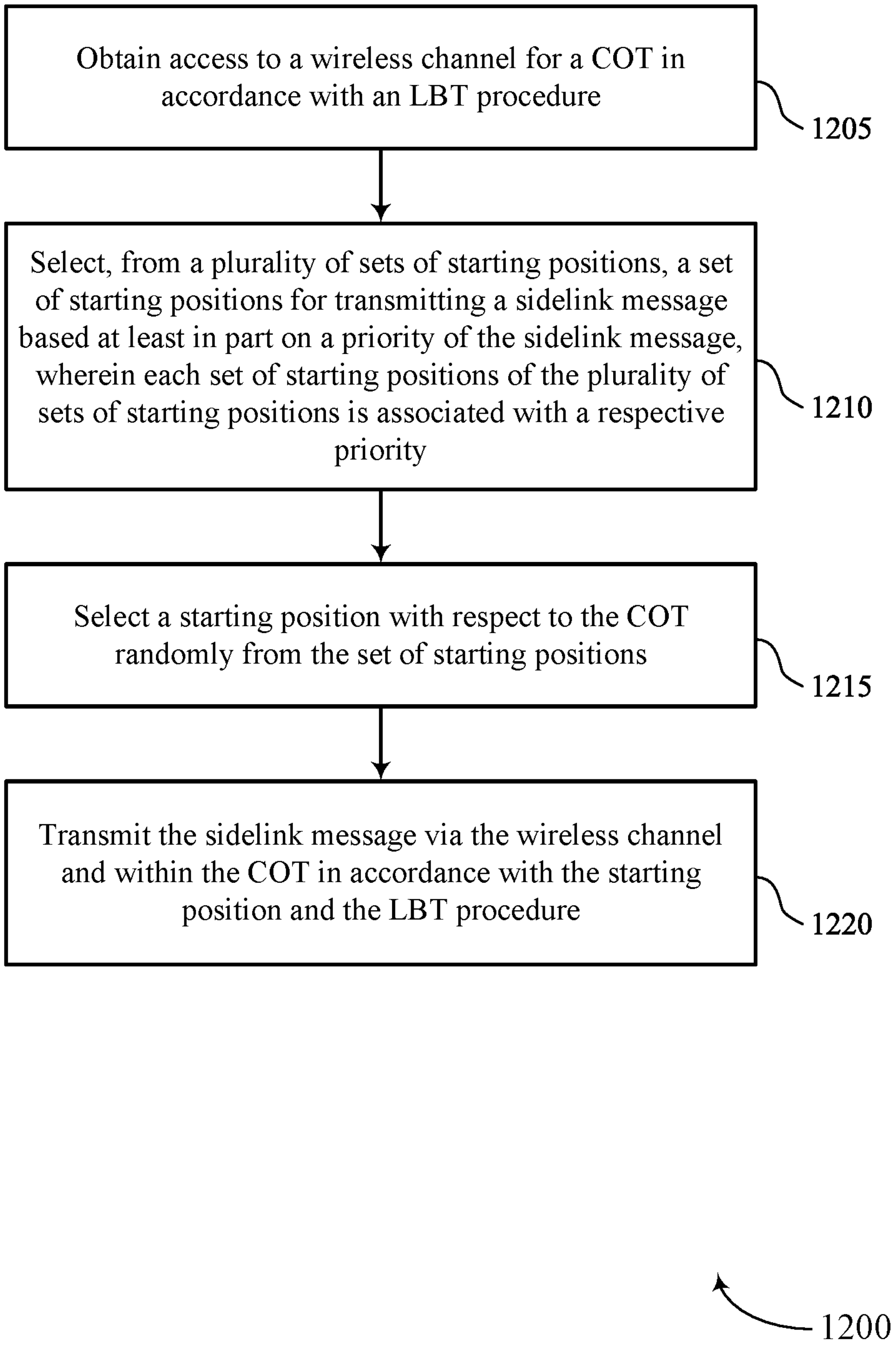

FIG. 12 shows a flowchart illustrating a method 1200 that supports channel access prioritization for high priority transmissions in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include obtaining access to a wireless channel for a COT in accordance with an LBT procedure. The operations of 1205 may be performed in accordance with examples as disclosed herein. In some examples, aspects of the operations of 1205 may be performed by an LBT component 840 as described with reference to FIG. 8.

At 1210, the method may include selecting, from a set of multiple sets of starting positions, a set of starting positions for transmitting a sidelink message based on a priority of the sidelink message, where each set of starting positions of the set of multiple sets of starting positions is associated with a respective priority. The operations of 1210 may be performed in accordance with examples as disclosed herein. In some examples, aspects of the operations of 1210 may be performed by a starting position component 845 as described with reference to FIG. 8.

At 1215, the method may include selecting a starting position with respect to the COT randomly or pseudo-randomly from the set of starting positions. The operations of 1215 may be performed in accordance with examples as disclosed herein. In some examples, aspects of the operations of 1215 may be performed by a starting position component 845 as described with reference to FIG. 8.

At 1220, the method may include transmitting the sidelink message via the wireless channel and within the COT in accordance with the starting position and the LBT procedure. The operations of 1220 may be performed in accordance with examples as disclosed herein. In some examples, aspects of the operations of 1220 may be performed by a sidelink transmission component 830 as described with reference to FIG. 8.

Figure 13:
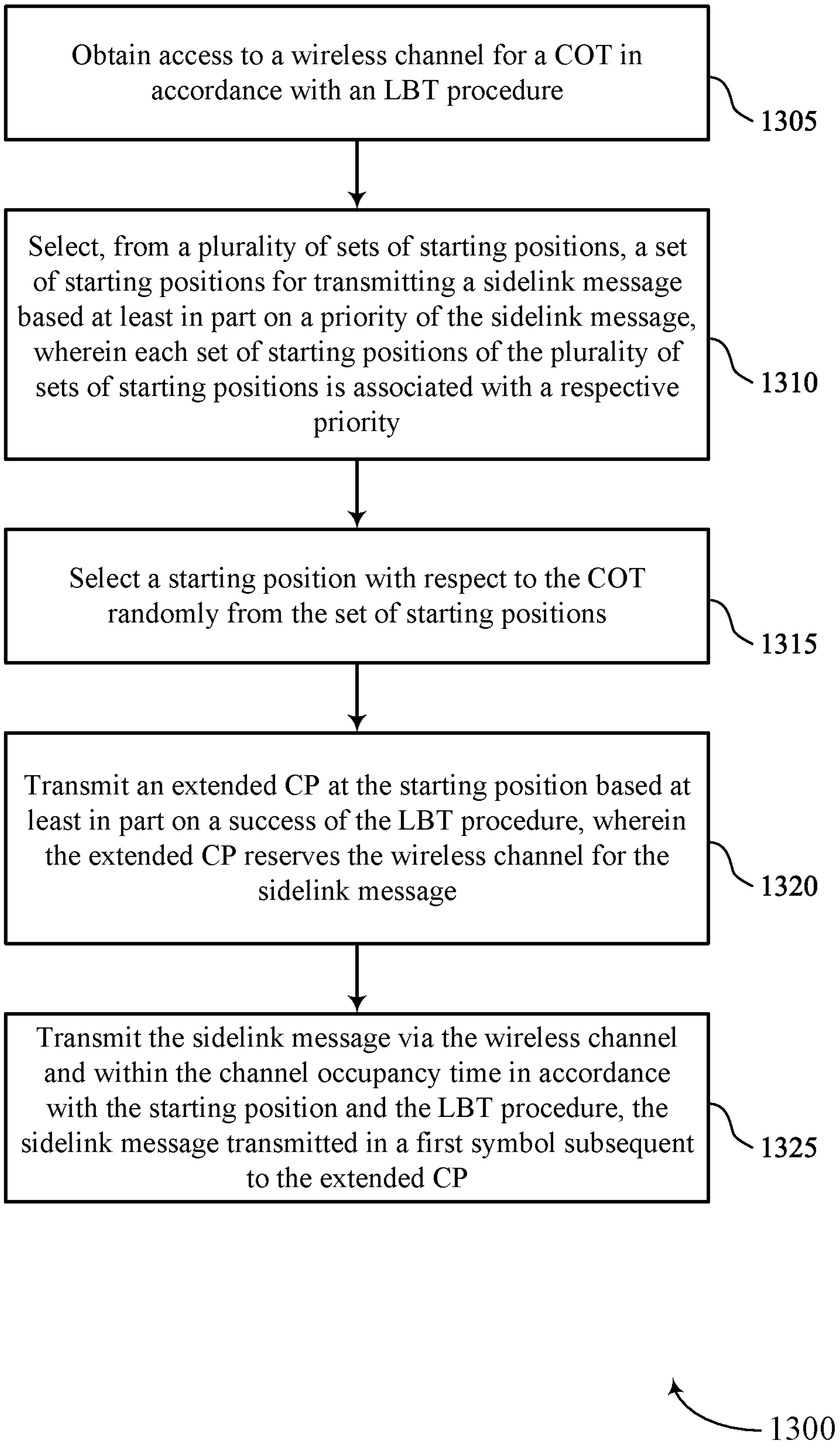

FIG. 13 shows a flowchart illustrating a method 1300 that supports channel access prioritization for high priority transmissions in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include obtaining access to a wireless channel for a COT in accordance with an LBT procedure. The operations of 1305 may be performed in accordance with examples as disclosed herein. In some examples, aspects of the operations of 1305 may be performed by an LBT component 840 as described with reference to FIG. 8.

At 1310, the method may include selecting, from a set of multiple sets of starting positions, a set of starting positions for transmitting a sidelink message based on a priority of the sidelink message, where each set of starting positions of the set of multiple sets of starting positions is associated with a respective priority. The operations of 1310 may be performed in accordance with examples as disclosed herein. In some examples, aspects of the operations of 1310 may be performed by a starting position component 845 as described with reference to FIG. 8.

At 1315, the method may include selecting a starting position with respect to the COT randomly or pseudo-randomly from the set of starting positions. The operations of 1315 may be performed in accordance with examples as disclosed herein. In some examples, aspects of the operations of 1315 may be performed by a starting position component 845 as described with reference to FIG. 8.

At 1320, the method may include transmitting an extended CP at the starting position based on a success of the LBT procedure, where the extended CP reserves the wireless channel for the sidelink message. The operations of 1320 may be performed in accordance with examples as disclosed herein. In some examples, aspects of the operations of 1320 may be performed by a sidelink transmission component 830 as described with reference to FIG. 8.

At 1325, the method may include transmitting the sidelink message via the wireless channel and within the COT in accordance with the starting position and the LBT procedure. The sidelink message may be transmitted in a first symbol subsequent to the extended CP. The operations of 1325 may be performed in accordance with examples as disclosed herein. In some examples, aspects of the operations of 1325 may be performed by a sidelink transmission component 830 as described with reference to FIG. 8.

Figure 14:
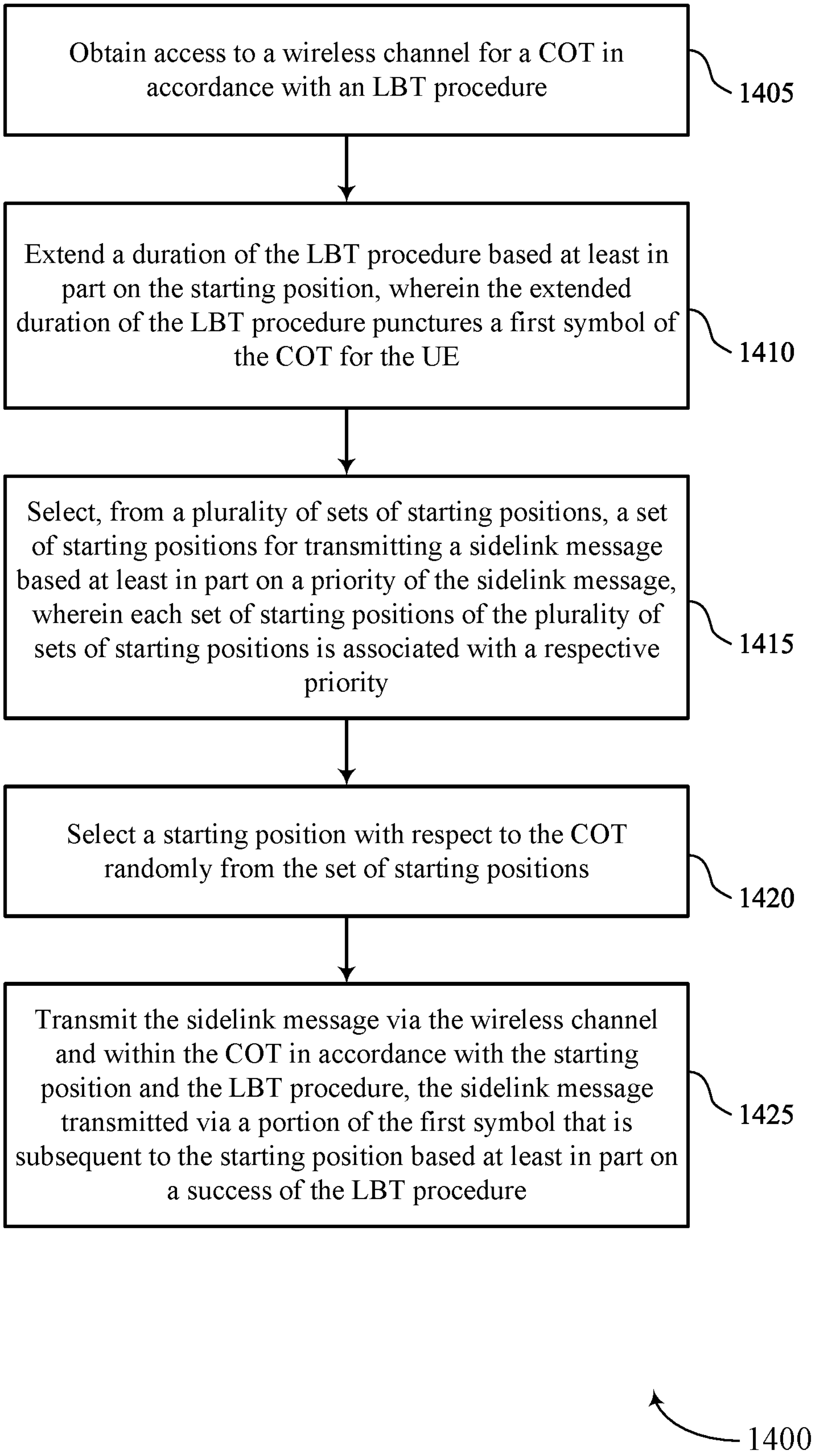

FIG. 14 shows a flowchart illustrating a method 1400 that supports channel access prioritization for high priority transmissions in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include obtaining access to a wireless channel for a COT in accordance with an LBT procedure. The operations of 1405 may be performed in accordance with examples as disclosed herein. In some examples, aspects of the operations of 1405 may be performed by an LBT component 840 as described with reference to FIG. 8.

At 1410, the method may include extending a duration of the LBT procedure based on the starting position, where the extended duration of the LBT procedure punctures a first symbol of the COT for the UE. The operations of 1410 may be performed in accordance with examples as disclosed herein. In some examples, aspects of the operations of 1410 may be performed by an LBT component 840 as described with reference to FIG. 8.

At 1415, the method may include selecting, from a set of multiple sets of starting positions, a set of starting positions for transmitting a sidelink message based on a priority of the sidelink message, where each set of starting positions of the set of multiple sets of starting positions is associated with a respective priority. The operations of 1415 may be performed in accordance with examples as disclosed herein. In some examples, aspects of the operations of 1415 may be performed by a starting position component 845 as described with reference to FIG. 8.

At 1420, the method may include selecting a starting position with respect to the COT randomly or pseudo-randomly from the set of starting positions. The operations of 1420 may be performed in accordance with examples as disclosed herein. In some examples, aspects of the operations of 1420 may be performed by a starting position component 845 as described with reference to FIG. 8.

At 1425, the method may include transmitting the sidelink message via the wireless channel and within the COT in accordance with the starting position and the LBT procedure. The sidelink message may be transmitted via a portion of the first symbol that is subsequent to the starting position based on a success of the LBT procedure. The operations of 1425 may be performed in accordance with examples as disclosed herein. In some examples, aspects of the operations of 1425 may be performed by a sidelink transmission component 830 as described with reference to FIG. 8.

The following provides an overview of aspects of the present disclosure:

Aspect 1: A method for wireless communication at a UE, comprising: determining a CAPC associated with a sidelink message based at least in part on a priority of the sidelink message: transmitting the sidelink message via one or more sidelink resources based at least in part on an LBT procedure performed by the UE: and performing one or more retransmissions of the sidelink message, wherein a quantity of the one or more retransmissions is based at least in part on the CAPC and the priority of the sidelink message.

Aspect 2: The method of aspect 1, further comprising: determining a quantity of the one or more sidelink resources based at least in part on the CAPC and the priority of the sidelink message, wherein the quantity of the one or more sidelink resources is proportional to a value of the CAPC.

Aspect 3: The method of any of aspects 1 through 2, wherein the quantity of the one or more retransmissions is proportional to a value of the CAPC.

Aspect 4: The method of any of aspects 1 through 3, further comprising: transmitting a second sidelink message via one or more second sidelink resources based at least in part on a second CAPC associated with the second sidelink message, wherein the second sidelink message and the sidelink message are transmitted separately based at least in part on the second CAPC being different than the CAPC.

Aspect 5: The method of any of aspects 1 through 3, further comprising: determining a plurality of priorities of a plurality of sidelink messages comprising at least the sidelink message: determining the CAPC for transmitting the plurality of sidelink messages based at least in part on one or more parameters associated with the plurality of sidelink messages, the one or more parameters comprising a PDB, a reliability, a packet size, or any combination thereof associated with each sidelink message of the plurality of sidelink messages: and transmitting the plurality of sidelink messages based at least in part on the CAPC.

Aspect 6: The method of aspect 5, further comprising: receiving a control signal that indicates a configuration of one or more threshold values for selecting the CAPC: and selecting the CAPC based at least in part on the one or more threshold values, wherein the CAPC is a maximum CAPC of the plurality of CAPCs or a minimum CAPC of the plurality of CAPCs based at least in part on the configuration of the one or more threshold values.

Aspect 7: The method of aspect 5, further comprising: determining one or more threshold values for selecting the CAPC: and selecting the CAPC based at least in part on the one or more threshold values, wherein the CAPC is a maximum CAPC of the plurality of CAPCs or a minimum CAPC of the plurality of CAPCs based at least in part on a configuration of the one or more threshold values.

Aspect 8: The method of any of aspects 1 through 3, further comprising: transmitting, to a base station, a signal that indicates a plurality of priorities of a plurality of sidelink messages comprising at least the sidelink message and one or more parameters associated with the plurality of sidelink messages: receiving, from the base station, an indication of a CAPC for transmitting the plurality of sidelink messages based at least in part on the one or more parameters, wherein the one or more parameters comprise a PDB, a reliability, a packet size, or any combination thereof associated with each sidelink message of the plurality of sidelink messages: and transmitting the plurality of sidelink messages based at least in part on the CAPC.

Aspect 9: The method of any of aspects 1 through 8, wherein the CAPC for the sidelink message corresponds to a contention window size for the sidelink message.

Aspect 10: A method for wireless communication at a UE, comprising: obtaining access to a wireless channel for a COT in accordance with an LBT procedure: selecting, from a plurality of sets of starting positions, a set of starting positions for transmitting a sidelink message based at least in part on a priority of the sidelink message, wherein each set of starting positions of the plurality of sets of starting positions is associated with a respective priority: selecting a starting position with respect to the COT randomly from the set of starting positions: and transmitting the sidelink message via the wireless channel and within the COT in accordance with the starting position and the LBT procedure.

Aspect 11: The method of aspect 10, wherein selecting the set of starting positions comprises: receiving control signaling that indicates the plurality of sets of starting positions for the UE: and selecting the set of starting positions from the plurality of sets of starting positions for the UE based at least in part on the priority of the sidelink message.

Aspect 12: The method of aspect 10, wherein selecting the set of starting positions comprises: receiving control signaling that indicates the plurality of sets of starting positions for a resource pool, wherein the sidelink message is transmitted via one or more sidelink resources of the resource pool: and selecting the set of starting positions from the plurality of sets of starting positions for the resource pool based at least in part on the priority of the sidelink message.

Aspect 13: The method of any of aspects 10 through 12, wherein transmitting the sidelink message comprises: transmitting an extended CP at the starting position based at least in part on a success of the LBT procedure, wherein the extended CP reserves the wireless channel for the sidelink message: and transmitting the sidelink message in a first symbol subsequent to the extended CP.

Aspect 14: The method of any of aspects 10 through 12, wherein transmitting the sidelink message comprises: extending a duration of the LBT procedure based at least in part on the starting position, wherein the extended duration of the LBT procedure punctures a first symbol of the COT for the UE; and transmitting the sidelink message via a portion of the first symbol that is subsequent to the starting position based at least in part on a success of the LBT procedure.

Aspect 15: The method of any of aspects 10 through 14, wherein the priority of the sidelink message is greater than a second priority associated with a second set of starting positions of the plurality of sets of starting positions: and each starting position of the set of starting positions is prior to each starting position of the second set of starting positions in time based at least in part on the priority associated with the set of starting positions being greater than the second priority associated with the second set of starting positions.

Aspect 16: The method of any of aspects 10 through 15, wherein the priority of the sidelink message corresponds to a CAPC or a sidelink traffic priority.

Aspect 17: An apparatus for wireless communication at a UE, comprising a processor: memory coupled with the processor: and instructions stored in the memory and executable by the processor to cause the apparatus to perform a method of any of aspects 1 through 9.

Aspect 18: An apparatus for wireless communication at a UE, comprising at least one means for performing a method of any of aspects 1 through 9.

Aspect 19: A non-transitory computer-readable medium storing code for wireless communication at a UE, the code comprising instructions executable by a processor to perform a method of any of aspects 1 through 9.

Aspect 20: An apparatus for wireless communication at a UE, comprising a processor: memory coupled with the processor: and instructions stored in the memory and executable by the processor to cause the apparatus to perform a method of any of aspects 10 through 16.

Aspect 21: An apparatus for wireless communication at a UE, comprising at least one means for performing a method of any of aspects 10 through 16.

Aspect 22: A non-transitory computer-readable medium storing code for wireless communication at a UE, the code comprising instructions executable by a processor to perform a method of any of aspects 10 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:

a processor;

memory coupled with the processor; and instructions stored in the memory and executable by the processor to cause the apparatus to:

determine a channel access priority class associated with a sidelink message based at least in part on a priority of the sidelink message;

transmit the sidelink message via one or more sidelink resources based at least in part on a listen-before-talk procedure performed by the UE; and perform one or more retransmissions of the sidelink message, wherein a quantity of the one or more retransmissions is based at least in part on the channel access priority class and the priority of the sidelink message; and determine a quantity of the one or more sidelink resources based at least in part on the channel access priority class and the priority of the sidelink message, wherein the quantity of the one or more sidelink resources is proportional to a value of the channel access priority class.

2. The apparatus of claim 1, wherein the quantity of the one or more retransmissions is proportional to a value of the channel access priority class.

3. The apparatus of claim 1, wherein the instructions are further executable by the processor to cause the apparatus to:

transmit a second sidelink message via one or more second sidelink resources based at least in part on a second channel access priority class associated with the second sidelink message, wherein the second sidelink message and the sidelink message are transmitted separately based at least in part on the second channel access priority class being different than the channel access priority class.

4. The apparatus of claim 1, wherein the instructions are further executable by the processor to cause the apparatus to:

determine a plurality of priorities of a plurality of sidelink messages comprising at least the sidelink message;

determine the channel access priority class for transmitting the plurality of sidelink messages based at least in part on one or more parameters associated with the plurality of sidelink messages, the one or more parameters comprising a packet delay budget, a reliability, a packet size, or any combination thereof associated with each sidelink message of the plurality of sidelink messages; and transmit the plurality of sidelink messages based at least in part on the channel access priority class.

5. The apparatus of claim 4, wherein the instructions are further executable by the processor to cause the apparatus to:

receive a control signal that indicates a configuration of one or more threshold values for selecting the channel access priority class; and select the channel access priority class based at least in part on the one or more threshold values, wherein the channel access priority class is a maximum channel access priority class of a plurality of channel access priority classes associated with the plurality of sidelink messages or a minimum channel access priority class of the plurality of channel access priority classes based at least in part on the configuration of the one or more threshold values.

6. The apparatus of claim 4, wherein the instructions are further executable by the processor to cause the apparatus to:

determine one or more threshold values for selecting the channel access priority class; and select the channel access priority class based at least in part on the one or more threshold values, wherein the channel access priority class is a maximum channel access priority class of a plurality of channel access priority classes associated with the plurality of sidelink messages or a minimum channel access priority class of the plurality of channel access priority classes based at least in part on a configuration of the one or more threshold values.

7. The apparatus of claim 1, wherein the instructions are further executable by the processor to cause the apparatus to:

transmit, to a base station, a signal that indicates a plurality of priorities of a plurality of sidelink messages comprising at least the sidelink message and one or more parameters associated with the plurality of sidelink messages;

receive, from the base station, an indication of the channel access priority class for transmitting the plurality of sidelink messages based at least in part on the one or more parameters, wherein the one or more parameters comprise a packet delay budget, a reliability, a packet size, or any combination thereof associated with each sidelink message of the plurality of sidelink messages; and transmit the plurality of sidelink messages based at least in part on the channel access priority class.

8. The apparatus of claim 1, wherein the channel access priority class for the sidelink message corresponds to a contention window size for the sidelink message.

9. An apparatus for wireless communication at a user equipment (UE), comprising:

a processor;

memory coupled with the processor; and instructions stored in the memory and executable by the processor to cause the apparatus to:

obtain access to a wireless channel for a channel occupancy time in accordance with a listen-before-talk procedure;

select, from a plurality of sets of starting positions, a set of starting positions for transmitting a sidelink message based at least in part on a priority of the sidelink message, wherein each set of starting positions of the plurality of sets of starting positions is associated with a respective priority;

select a starting position with respect to the channel occupancy time randomly from the set of starting positions; and transmit the sidelink message via the wireless channel and within the channel occupancy time in accordance with the starting position and the listen-before-talk procedure.

10. The apparatus of claim 9, wherein the instructions to select the set of starting positions are executable by the processor to cause the apparatus to:

receive control signaling that indicates the plurality of sets of starting positions for the UE; and select the set of starting positions from the plurality of sets of starting positions for the UE based at least in part on the priority of the sidelink message.

11. The apparatus of claim 9, wherein the instructions to select the set of starting positions are executable by the processor to cause the apparatus to:

receive control signaling that indicates the plurality of sets of starting positions for a resource pool, wherein the sidelink message is transmitted via one or more sidelink resources of the resource pool; and select the set of starting positions from the plurality of sets of starting positions for the resource pool based at least in part on the priority of the sidelink message.

12. The apparatus of claim 9, wherein the instructions to transmit the sidelink message are executable by the processor to cause the apparatus to:

transmit an extended cyclic prefix at the starting position based at least in part on a success of the listen-before-talk procedure, wherein the extended cyclic prefix reserves the wireless channel for the sidelink message; and transmit the sidelink message in a first symbol subsequent to the extended cyclic prefix.

13. The apparatus of claim 9, wherein the instructions to transmit the sidelink message are executable by the processor to cause the apparatus to:

extend a duration of the listen-before-talk procedure based at least in part on the starting position, wherein the extended duration of the listen-before-talk procedure punctures a first symbol of the channel occupancy time for the UE; and transmit the sidelink message via a portion of the first symbol that is subsequent to the starting position based at least in part on a success of the listen-before-talk procedure.

14. The apparatus of claim 9, wherein:

the priority of the sidelink message is greater than a second priority associated with a second set of starting positions of the plurality of sets of starting positions; and each starting position of the set of starting positions is prior to each starting position of the second set of starting positions in time based at least in part on the priority associated with the set of starting positions being greater than the second priority associated with the second set of starting positions.

15. The apparatus of claim 9, wherein the priority of the sidelink message corresponds to a channel access priority class or a sidelink traffic priority.

16. A method for wireless communication at a user equipment (UE), comprising:

determining a channel access priority class associated with a sidelink message based at least in part on a priority of the sidelink message;

transmitting the sidelink message via one or more sidelink resources based at least in part on a listen-before-talk procedure performed by the UE; and performing one or more retransmissions of the sidelink message, wherein a quantity of the one or more retransmissions is based at least in part on the channel access priority class and the priority of the sidelink message; and determining a quantity of the one or more sidelink resources based at least in part on the channel access priority class and the priority of the sidelink message, wherein the quantity of the one or more sidelink resources is proportional to a value of the channel access priority class.

17. The method of claim 16, wherein the quantity of the one or more retransmissions is proportional to a value of the channel access priority class.

18. The method of claim 16, further comprising:

transmitting a second sidelink message via one or more second sidelink resources based at least in part on a second channel access priority class associated with the second sidelink message, wherein the second sidelink message and the sidelink message are transmitted separately based at least in part on the second channel access priority class being different than the channel access priority class.

19. The method of claim 16, further comprising:

determining a plurality of priorities of a plurality of sidelink messages comprising at least the sidelink message;

determining the channel access priority class for transmitting the plurality of sidelink messages based at least in part on one or more parameters associated with the plurality of sidelink messages, the one or more parameters comprising a packet delay budget, a reliability, a packet size, or any combination thereof associated with each sidelink message of the plurality of sidelink messages; and transmitting the plurality of sidelink messages based at least in part on the channel access priority class.

20. The method of claim 19, further comprising:

receiving a control signal that indicates a configuration of one or more threshold values for selecting the channel access priority class; and selecting the channel access priority class based at least in part on the one or more threshold values, wherein the channel access priority class is a maximum channel access priority class of a plurality of channel access priority classes associated with the plurality of sidelink messages or a minimum channel access priority class of the plurality of channel access priority classes based at least in part on the configuration of the one or more threshold values.

21. The method of claim 19, further comprising:

determining one or more threshold values for selecting the channel access priority class; and selecting the channel access priority class based at least in part on the one or more threshold values, wherein the channel access priority class is a maximum channel access priority class of a plurality of channel access priority classes associated with the plurality of sidelink messages or a minimum channel access priority class of the plurality of channel access priority classes based at least in part on a configuration of the one or more threshold values.

22. The method of claim 16, further comprising:

transmitting, to a base station, a signal that indicates a plurality of priorities of a plurality of sidelink messages comprising at least the sidelink message and one or more parameters associated with the plurality of sidelink messages;

receiving, from the base station, an indication of the channel access priority class for transmitting the plurality of sidelink messages based at least in part on the one or more parameters, wherein the one or more parameters comprise a packet delay budget, a reliability, a packet size, or any combination thereof associated with each sidelink message of the plurality of sidelink messages; and transmitting the plurality of sidelink messages based at least in part on the channel access priority class.

23. A method for wireless communication at a user equipment (UE), comprising:

obtaining access to a wireless channel for a channel occupancy time in accordance with a listen-before-talk procedure;

selecting, from a plurality of sets of starting positions, a set of starting positions for transmitting a sidelink message based at least in part on a priority of the sidelink message, wherein each set of starting positions of the plurality of sets of starting positions is associated with a respective priority;

selecting a starting position with respect to the channel occupancy time randomly from the set of starting positions; and transmitting the sidelink message via the wireless channel and within the channel occupancy time in accordance with the starting position and the listen-before-talk procedure.

24. The method of claim 23, wherein selecting the set of starting positions comprises:

receiving control signaling that indicates the plurality of sets of starting positions for the UE; and selecting the set of starting positions from the plurality of sets of starting positions for the UE based at least in part on the priority of the sidelink message.

25. The method of claim 23, wherein selecting the set of starting positions comprises:

receiving control signaling that indicates the plurality of sets of starting positions for a resource pool, wherein the sidelink message is transmitted via one or more sidelink resources of the resource pool; and selecting the set of starting positions from the plurality of sets of starting positions for the resource pool based at least in part on the priority of the sidelink message.

26. The method of claim 23, wherein transmitting the sidelink message comprises:

transmitting an extended cyclic prefix at the starting position based at least in part on a success of the listen-before-talk procedure, wherein the extended cyclic prefix reserves the wireless channel for the sidelink message; and transmitting the sidelink message in a first symbol subsequent to the extended cyclic prefix.

27. The method of claim 23, wherein transmitting the sidelink message comprises:

extending a duration of the listen-before-talk procedure based at least in part on the starting position, wherein the extended duration of the listen-before-talk procedure punctures a first symbol of the channel occupancy time for the UE; and transmitting the sidelink message via a portion of the first symbol that is subsequent to the starting position based at least in part on a success of the listen-before-talk procedure.

28. The method of claim 23, wherein:

the priority of the sidelink message is greater than a second priority associated with a second set of starting positions of the plurality of sets of starting positions; and each starting position of the set of starting positions is prior to each starting position of the second set of starting positions in time based at least in part on the priority associated with the set of starting positions being greater than the second priority associated with the second set of starting positions.

* * * * *